US012681033B2

(12) United States Patent　　　　　(10) Patent No.:　US 12,681,033 B2
Crivelli et al.　　　　　　　　　　　　(45) Date of Patent:　　　Jul. 14, 2026

(54) REAGENT RESERVOIRS AND RELATED SYSTEMS AND METHODS

(71) Applicant: ILLUMINA, INC., San Diego, CA (US)

(72) Inventors: Paul Crivelli, San Diego, CA (US); Justin Davidson, Solana Beach, CA (US); Norman Khoo, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 751 days.

(21) Appl. No.: 18/075,753

(22) Filed: Dec. 6, 2022

(65) Prior Publication Data

US 2023/0184800 A1　　Jun. 15, 2023

Related U.S. Application Data

(60) Provisional application No. 63/288,287, filed on Dec. 10, 2021.

(51) Int. Cl.
　　G01N 35/10　　　　(2006.01)
　　G01N 35/00　　　　(2006.01)
(52) U.S. Cl.
　　CPC ................... G01N 35/1002 (2013.01); *G01N 2035/00287* (2013.01); *G01N 2035/00306* (2013.01); *G01N 2035/1055* (2013.01)
(58) Field of Classification Search
　　CPC ....... B01L 3/502792; B01L 2400/0487; B01L 2200/0689; B01L 2300/0816; B01L 2400/0427; B01L 2200/16; B01L 2200/06; B01L 3/527; B01L 2300/165;

B01L 2200/0673; B01L 2200/0684; B01L 2300/123; B01L 3/502715; B01L 3/523; B01L 2200/027; B01L 2300/0636; B01L 2400/0638; B01L 2300/0867; B01L 2300/0877; B01L 2400/0655; B01L 2300/048; B01L 2300/0672; B01L 2400/0644; B01L 3/502707; B01L 2300/069; B01L 2300/0851; B01L 2300/0858; B01L 2300/161; B01L 3/502784; B01L 2200/04; B01L 2300/087;

(Continued)

(56) References Cited

U.S. PATENT DOCUMENTS

2013/0136671 A1　5/2013　Li et al.
2017/0157611 A1　6/2017　Weber (Continued)

FOREIGN PATENT DOCUMENTS

KR　10-2016-0040514 A　4/2016
KR　10-2019-0095112 A　8/2019
WO　WO-2020/014400 A1　1/2020

*Primary Examiner* — Dean Kwak
(74) *Attorney, Agent, or Firm* — MARSHALL, GERSTEIN & BORUN LLP

(57)　　　　　　ABSTRACT

Reagent reservoirs and related systems and methods are disclosed. In accordance with a first implementation, an apparatus includes a system and a reagent reservoir. The system includes a reagent reservoir receptacle. The reagent reservoir is received within the reagent reservoir receptacle and has a body and a fluidic port. The body defines a storage chamber, a sipper chamber, and a fluidic sinus fluidly coupling the storage chamber and the sipper chamber. The fluidic port is fluidly coupled to the sipper chamber.

8 Claims, 17 Drawing Sheets

(58) Field of Classification Search
CPC ............... B01L 3/502; B01L 2200/021; B01L 2200/026; B01L 2200/10; B01L 2200/12; B01L 2300/041; B01L 2300/0883; B01L 2300/0887; B01L 2400/0605; B01L 2400/0633; B01L 2400/0666; B01L 3/50273; B01L 2300/0819; B01L 2400/04; B01L 2400/0418; B01L 2400/0421; B01L 2400/0424; B01L 2400/0622; B01L 2400/0683; B01L 3/502723; B01L 3/502761; B01L 2200/0605; B01L 2200/0621; B01L 2300/044; B01L 2300/06; B01L 2300/166; B01L 2300/18; B01L 2400/0475; B01L 2400/086; B01L 3/0293; B01L 2200/028; B01L 2200/0657; B01L 2200/141; B01L 2300/0645; B01L 2300/0681; B01L 2300/0829; B01L 2300/0874; B01L 2300/12; B01L 2300/16; B01L 2300/163; B01L 2300/1822; B01L 2300/1894; B01L 2400/0406; B01L 2400/0409; B01L 2400/049; B01L 3/50255; B01L 3/5027; B01L 3/502738; B01L 3/50853; B01L 2200/025; B01L 2200/0668; B01L 2300/0663; B01L 2300/1805; B01L 2300/1827; B01L 2400/0478; B01L 2400/0481; B01L 2400/065; B01L 7/00; B01L 7/52; B01L 7/525; B01L 2200/0642; B01L 2200/142; B01L 2300/023; B01L 2300/043; B01L 2300/045; B01L 2300/047; B01L 2300/0654; B01L 2300/0809; B01L 2300/0864; B01L 2400/0403; B01L 2400/043; B01L 2400/06; B01L 2400/084; B01L 3/00; B01L 3/0265; B01L 3/0275; B01L 3/5025; B01L 3/502746; B01L 3/5085; B01L 3/5088; B01L 9/527; G01N 35/1002; G01N 2035/00287; G01N 2035/00306; G01N 2035/1055; G01N 2021/058

See application file for complete search history.

(56) References Cited

U.S. PATENT DOCUMENTS

| | | | |
|---|---|---|---|
| 2017/0199210 A1 | 7/2017 | Ang et al. | |
| 2019/0178787 A1* | 6/2019 | Anderson | ............... G01F 23/02 |
| 2020/0254450 A1 | 8/2020 | Crivelli et al. | |
| 2021/0276241 A1 | 9/2021 | Crivelli et al. | |

* cited by examiner

*700*

Start

702 — Couple A Fluidic Interface With A Fluidic Port Of A Reagent Reservoir

704 — Flow Reagent From A Storage Chamber Through A Sipper Chamber And The Fluidic Port To The Fluidic Interface End

*800*

Start

802 — Injection Mold A Reagent Reservoir

804 — Injection Mold A Lid

806 — Overmold A Fluidic Port On The Lid

808 — Laser Weld The Lid To A Body Of The Reagent Reservoir Around The Storage Chamber And A Sipper Chamber 810 — Form A Stuffer 812 — Secure Stuffer Within Sipper Chamber End

REAGENT RESERVOIRS AND RELATED SYSTEMS AND METHODS

CROSS-REFERENCE TO RELATED APPLICATIONS

This application claims the benefit of U.S. Provisional Application No. 63/288,287 filed Dec. 10, 2021, the entire contents of which are incorporated herein by reference in their entirety.

BACKGROUND

Sequencing platforms may include sippers that pierce a cover of a reagent reservoir and draw reagent from the reagent reservoir.

SUMMARY

Advantages over the prior art and benefits as described later in this disclosure can be achieved through the provision of reagent reservoirs and related systems and methods. Various implementations of the apparatus and methods are described below, and the apparatus and methods, including and excluding the additional implementations enumerated below, in any combination (provided these combinations are not inconsistent), may overcome these shortcomings and achieve the benefits described herein.

In accordance with a first implementation, an apparatus includes a system and a reagent reservoir. The system includes a reagent reservoir receptacle. The reagent reservoir is received within the reagent reservoir receptacle and has a body and a fluidic port. The body defines a storage chamber, a sipper chamber, and a fluidic sinus fluidly coupling the storage chamber and the sipper chamber. The fluidic port is fluidly coupled to the sipper chamber.

In accordance with a second implementation, an apparatus includes a reagent reservoir and a fluidic port. The reagent reservoir has a body defining a storage chamber, a sipper chamber, and a fluidic sinus fluidly coupling the storage chamber and the sipper chamber. The fluidic port is fluidly coupled to the sipper chamber.

In accordance with a third implementation, a method includes coupling a fluidic interface of a system with a fluidic port of a reagent reservoir. The reagent reservoir has a body defining a storage chamber, a sipper chamber, and a fluidic sinus fluidly coupling the storage chamber and the sipper chamber. The method also includes flowing reagent from the storage chamber through the sipper chamber and the fluidic port to the fluidic interface.

In accordance with a fourth implementation, a method includes injection molding a reagent reservoir including a body defining a storage chamber in part by a wall, a sipper chamber in part by the wall, and a fluidic sinus between the storage chamber and the sipper chamber. The method also includes injection molding a lid, overmolding a fluidic port on the lid, and laser welding the lid to the body of the reagent reservoir around the storage chamber and the sipper chamber.

In accordance with a fifth implementation, an apparatus includes a system, a liquid reservoir, a lid assembly, and a cartridge assembly. The system includes a pneumatic interface and a receptacle. The liquid reservoir is receivable within the receptacle and has a body comprising a top surface comprising a fluidic opening, a storage chamber having an opening at the top surface, a fluidic sinus, and a side of the body defining an outward-facing groove. The fluidic opening is fluidly coupled to the groove, and the fluidic sinus is fluidly coupling the storage chamber and the groove. A cover is secured to the side of the body, and the groove and the cover define a sipper fluidic path. The lid assembly is coupled to the top surface and has a first portion covering the opening of the storage chamber and a second portion covering the opening of the sipper fluidic path. The top surface and the first portion define a plenum, and the first portion includes a pneumatic port fluidly coupled to the plenum. The second portion includes a fluidic port fluidly coupled to the fluidic opening. The cartridge assembly includes a fluidic interface couplable to the fluidic port, a well, and a channel fluidly coupled between the fluidic interface and the well.

In accordance with a sixth implementation, an apparatus includes a liquid reservoir having a body, a cover, and a fluidic port. The body includes a top surface having a fluidic opening, a storage chamber having an opening at the top surface, and a fluidic sinus. A side of the body defines an outward-facing groove, and the fluidic opening is fluidly coupled to the groove. The fluidic sinus fluidly couples the storage chamber and the groove. The cover is secured to the side of the body, and the groove and the cover define a sipper fluidic path. The fluidic port is fluidly coupled to the sipper fluidic path. A fluidic interface is to couple with the fluidic port to enable fluid to flow out of the sipper fluidic path.

In accordance with a seventh implementation, a method includes coupling a fluidic interface of a cartridge assembly with a fluidic port of a lid assembly of a liquid reservoir by a sipper fluidic path of the liquid reservoir. The liquid reservoir has a body comprising a top surface comprising a fluidic opening, a storage chamber having an opening at the top surface, a fluidic sinus, and a side of the body defining an outward-facing groove. The fluidic opening is fluidly coupled to the groove, and the fluidic sinus is fluidly coupled to the storage chamber and the groove. A cover is secured to the side of the body, and the groove and the cover define the sipper fluidic path. The method further includes flowing reagent from the storage chamber and through the sipper fluidic path to the fluidic interface.

In accordance with an eighth implementation, a method of manufacturing an apparatus includes injection molding a reagent reservoir comprising a body defining a storage chamber and having a side defining an outwardly-facing groove, a fluidic sinus fluidly coupling the storage chamber and the groove. The method of manufacturing further includes laser welding a cover to the reagent reservoir to form a sipper fluidic path between the groove and the cover.

In accordance with a ninth implementation, an apparatus includes a system and a reagent reservoir. The system includes a reagent manifold assembly and a reagent reservoir receptacle. The reagent manifold assembly has a fluidic interface. The reagent reservoir is received within the reagent reservoir receptacle and has a body and a fluidic port. The body defines a storage chamber, a sipper chamber, and a fluidic sinus fluidly coupling the storage chamber and the sipper chamber. The fluidic port is fluidly coupled to the sipper chamber. The fluidic interface is to couple with the fluidic port to allow fluid to flow out of the sipper chamber.

In accordance with a tenth implementation, an apparatus includes a system and a reagent reservoir. The system includes a reagent reservoir receptacle. The reagent reservoir is received within the reagent reservoir receptacle and has a body and a fluidic port. The body defines a storage chamber, a sipper fluidic path, and a fluidic sinus fluidly coupling the storage chamber and the sipper fluidic path. The fluidic port is fluidly coupled to the sipper chamber.

In further accordance with the foregoing first, second, third, fourth, fifth, sixth, seventh, eighth, ninth, and/or tenth implementations, an apparatus and/or method may further comprise or include any one or more of the following:

In an implementation, the body is injection molded.

In another implementation, the apparatus further includes a stuffer disposed within the sipper chamber.

In another implementation, the stuffer defines a sipper channel fluidly coupling the storage chamber and the fluidic port.

In another implementation, a top surface of the body defines a flow path fluidly coupling the sipper chamber and the fluidic port.

In another implementation, the lid is sealed around the sipper chamber and the flow path.

In another implementation, the sipper channel is an open channel.

In another implementation, the sipper channel is a closed channel.

In another implementation, surfaces of the body defining the sipper chamber and the stuffer define a sipper channel fluidly coupling the storage chamber and the fluidic port.

In another implementation, the body includes a wall positioned between the storage chamber and the sipper chamber and the stuffer extends past a distal end of the wall.

In another implementation, the apparatus includes a lid and the stuffer is coupled to the lid.

In another implementation, the apparatus includes a lid and the stuffer is not coupled to the lid. In another implementation, the system includes a pneumatic interface and an actuator and the reagent reservoir includes a pneumatic port. The actuator moves the pneumatic interface to couple with the pneumatic port.

In another implementation, the system includes an actuator that moves the reagent reservoir.

In another implementation, the system includes an actuator.

In another implementation, the system includes an actuator that moves the reagent manifold assembly to couple the fluidic port and the fluidic interface.

In another implementation, the apparatus further includes reagent contained within the storage chamber.

In another implementation, the reagent includes dehydrated reagent.

In another implementation, the reagent reservoir further includes a lid coupled to the body.

In another implementation, the lid includes the fluidic port.

In another implementation, the body has a top surface and a bottom surface and the storage chamber has an opening at the top surface and the sipper chamber has an opening at the top surface. The apparatus further includes a lid coupled to the top surface, covering the opening of the storage chamber and the opening of the sipper chamber, and sealed around the storage chamber.

In another implementation, the body includes a wall positioned between the storage chamber and the sipper chamber.

In another implementation, the body further includes a fill port on the bottom surface and a cover covering the fill port.

In another implementation, the fill port provides access to the storage chamber prior to the cover covering the fill port.

In another implementation, the fill port includes a collar.

In another implementation, the cover includes foil.

In another implementation, the system pressurizes the storage chamber.

In another implementation, wherein the system includes a reagent manifold assembly having a pneumatic interface and the reagent reservoir has a pneumatic port fluidly coupled to the storage chamber. The pneumatic interface of the reagent manifold assembly is to couple with the pneumatic port to pressurize the storage chamber. In another implementation, the apparatus further includes a cover covering the pneumatic port.

In another implementation, the system comprises a piercer to pierce the cover.

In another implementation, that apparatus includes a lid that is laser welded to the body.

In another implementation, a top surface of the body and a lid define a flow path fluidly coupling the sipper chamber and the fluidic port.

In another implementation, the lid is sealed around the sipper chamber and the flow path.

In another implementation, the body defines a second storage chamber, a second sipper chamber, and a second sinus fluidly coupling the second storage chamber and the second sipper chamber. The lid is sealed around the second storage chamber.

In another implementation, the apparatus also includes a second fluidic port coupled to the lid and to the second sipper chamber.

In another implementation, the body includes a wall positioned between the second storage chamber and the second sipper chamber.

In another implementation, the reagent reservoir has a pneumatic port coupled to the lid and a pneumatic manifold fluidly coupling the pneumatic port and the storage chamber and the second storage chamber.

In another implementation, the pneumatic manifold includes manifold ports defined through a lip of the body of the reagent reservoir, an impermeable cover coupled to a lower surface of the lip, channels defined by a top surface of the body. Each channel couples one of the manifold ports and a corresponding storage chamber and the pneumatic port is fluidly coupled to each of the manifold ports by a flow path defined between the lower surface of the lip and the impermeable cover.

In another implementation, the apparatus further includes an elastomer cover coupled to the lower surface of the lip and covering the impermeable cover.

In another implementation, the pneumatic manifold includes channels defined by the body and an impermeable cover coupled to the body and covering the flow channels.

In another implementation, the impermeable cover includes foil.

In another implementation, flowing the reagent from the storage chamber includes the system pressurizing the storage chamber.

In another implementation, flowing the reagent from the storage chamber includes the system drawing the reagent from the storage chamber.

In another implementation, flowing the reagent through the sipper chamber includes flowing the reagent through a sipper channel defined by internal surfaces of the body defining the sipper chamber and a stuffer received within the sipper chamber.

In another implementation, flowing the reagent through the sipper chamber includes flowing the reagent through a sipper channel defined by a stuffer received within the sipper chamber.

In another implementation, the method further includes forming a stuffer.

In another implementation, injection molding the lid and forming the stuffer includes injection molding a core integral with the lid and overmolding an exterior elastomer over the core to form a stuffer.

In another implementation, forming the stuffer includes injection molding the stuffer from an elastomer.

In another implementation, the method further includes securing the stuffer within the sipper chamber.

In another implementation, the apparatus includes liquid contained within the storage chamber.

In another implementation, the apparatus includes dried reagent contained within the well.

In another implementation, the cartridge assembly comprises a flow cell.

In another implementation, the cover comprises a laminate.

In another implementation, the apparatus includes a horizontal channel within the body between the groove and the fluidic opening.

In another implementation, the apparatus includes a stuffer disposed within the horizontal channel.

In another implementation, the stuffer defines a horizontal channel fluidly coupling the storage chamber and the fluidic port.

In another implementation, a horizontal channel within the body fluidly couples the sipper fluidic path and the fluidic port.

In another implementation, the stuffer defines a horizontal channel fluidly coupling the storage chamber and the fluidic port.

In another implementation, the body defines a second storage chamber and a second fluidic sinus. The side defines a second outward-facing groove, and the second fluidic sinus couples the second storage chamber and the second groove. A second sipper fluidic path is defined between the second groove and the cover.

In another implementation, a second fluidic port is coupled to the lid and to the second sipper fluidic path.

In another implementation, flowing the reagent to the fluidic interface comprises flowing the reagent through a horizontal channel defined by surfaces of the body.

In another implementation, flowing the reagent to the fluidic interface comprises flowing the reagent through a horizontal channel defined by at least one surface of the body and a surface of a stuffer received within a horizontal channel of the body.

In another implementation, injection molding the reagent reservoir includes injection molding a horizontal channel within the body between the groove and a fluidic opening, and securing a stuffer within the horizontal channel.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

DETAILED DESCRIPTION

Figure 1:
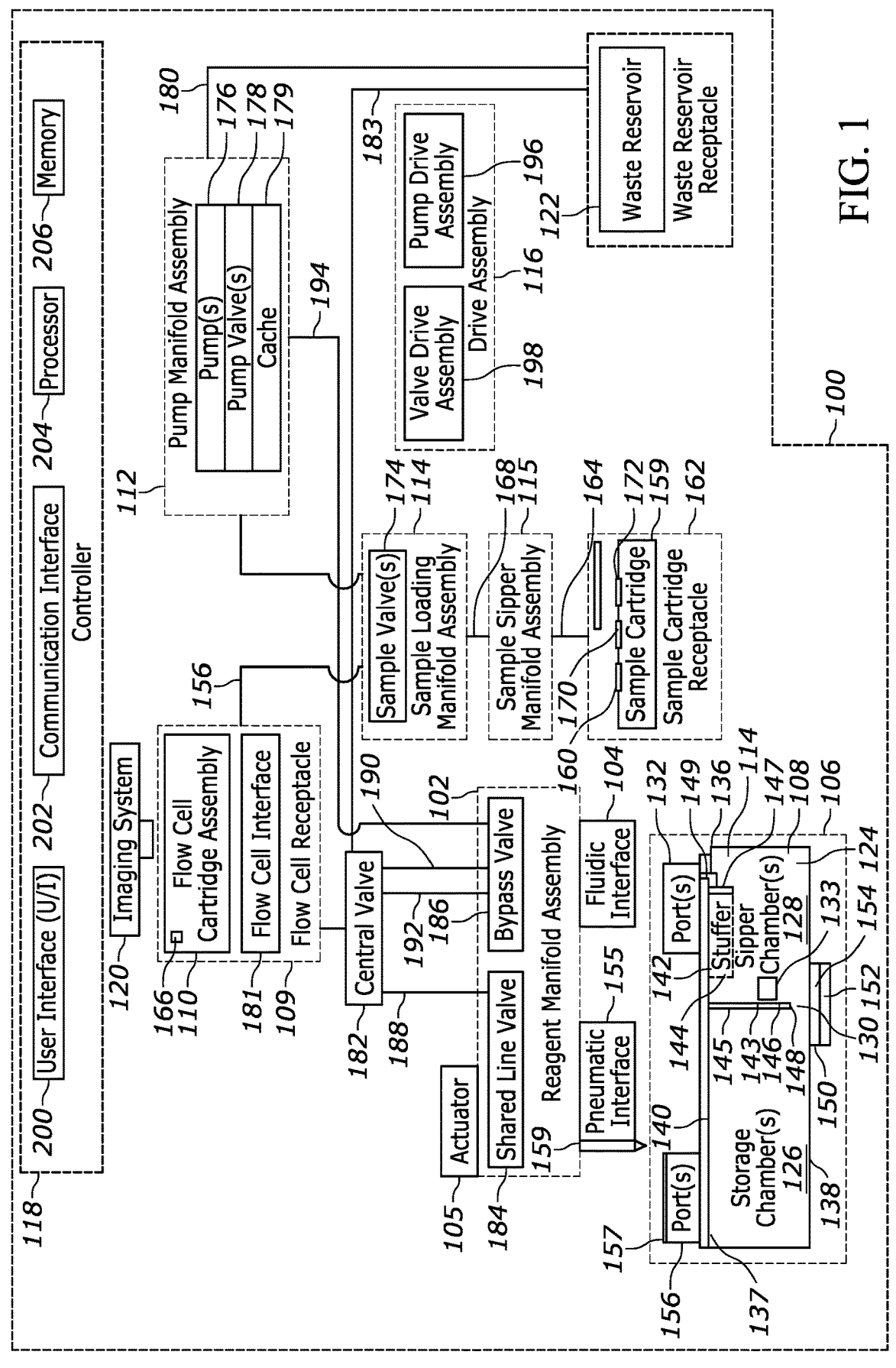
FIG. 1 illustrates a schematic diagram of an implementation of a system in accordance with the teachings of this disclosure.

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

The implementations disclosed herein relate to reagent cartridges and related systems having integrated sippers that allow the systems (e.g., sequencing systems) to be less complex and, thus, less expensive. The complexity of the system can be reduced because the reagent cartridges include the sippers and, thus, the system does not include the sippers and/or related components such as piercers, for example.

The example reagent cartridges (consumables) have a body defining a storage chamber holding reagent, a sipper chamber, and a fluidic sinus fluidly coupling the storage chamber and the sipper chamber at the bottom of the reagent cartridge. The sipper chamber may be referred to as a sipper fluidic path. Reagent is stored in the storage chamber and can flow from the storage chamber through the fluidic sinus to the sipper chamber. A fluidic port is fluidly coupled to the sipper chamber on the top of the reagent cartridge and the system has a fluidic interface that couples with the fluidic port. A reagent cartridge including dry reagent may alternatively include the fluidic interface and couple with the fluidic port of the reagent cartridge.

The reagent cartridge also has a fill port on the bottom of the reagent cartridge that is covered by a cover and a lid covering the storage chamber and the sipper chamber. The cover may be foil. The lid and/or the cover may be laser welded to the body of the reagent cartridge.

A stuffer is sometimes positioned within the sipper chamber that reduces volume of the sipper chamber and, thus, reduces dead volume of reagent. The cross-section of the sipper chamber may be larger because of the manufacturing methods used to produce the reagent cartridge. The cross-section of the sipper chamber may be about 10 millimeters (mm) by about 10 mm and the reagent cartridge may be manufactured by injection molding techniques. The sipper chambers in such examples are defined by an injection mold tool steel and able to withstand high pressures encountered when plastic is injected into the molded steel tool. The larger area of the sipper chamber makes for a very large "straw" for the instrument to sip from and may result in excessive dead volume when the reagent reservoir is nearly empty. The stuffer can be inserted into the sipper chamber to occupy most of the volume of the sipper chamber and reduce the dead volume within the reagent reservoir as mentioned above.

The stuffer and/or surfaces of the reagent cartridge defining the sipper chamber define a sipper channel through which the reagent travels to the fluidic port of the reagent reservoir. The sipper channel can be an open sipper channel and/or a closed sipper channel when the sipper channel is defined by the stuffer. The stuffer may be coupled to the lid of the reagent cartridge or may be a separate component positioned within the sipper chamber and not coupled to the lid. The stuffer may not be installed within the sipper chamber to reduce the cost of the reagent reservoir when less expensive reagent and/or where dead volume and wasted reagent is less of a concern, for example.

In another implementation, an integrated sipper is formed between a body and a cover, thereby reducing the complexity of manufacturing the body. A fluidic sinus of the body couples the storage chamber with an outward-facing groove on a side of the body. A cover is secured to the side of the body, and the groove and the cover define a sipper fluidic path. Reagent is stored in the storage chamber and can flow from the storage chamber through the fluidic sinus to the sipper fluidic path. A fluidic port of a lid assembly is coupled to the fluidic opening of the body that is fluidly coupled to the sipper fluidic path. A horizontal passage within the body fluidly couples the sipper fluidic path and the fluidic port. The horizontal passage may be referred to as a horizontal channel. Optionally, a stuffer may be provided within the horizontal passage to reduce the volume of the horizontal passage.

FIG. 1 illustrates a schematic diagram of an implementation of a system 100 in accordance with the teachings of this disclosure. The system 100 can be used to perform an analysis on one or more samples of interest. The sample may include one or more DNA clusters that have been linearized to form a single stranded DNA (sstDNA). The system 100 has a reagent manifold assembly 102 having a fluidic interface 104 and an associated actuator 105 and a reagent reservoir receptacle 106 that receives a reagent reservoir 108. The actuator 105 may alternatively be associated with the reagent reservoir receptacle 106. The system 100 also includes a flow cell receptacle 109 that receives a flow cell cartridge assembly 110 in the implementation shown. The system 100 also has a pump manifold assembly 112, a sample loading manifold assembly 114, a sample sipper manifold assembly 115, a drive assembly 116, a controller 118, an imaging system 120, and a waste reservoir 122. The controller 118 is electrically and/or communicatively coupled to the reagent manifold assembly 102, the actuator 105, the pump manifold assembly 112, the sample loading manifold assembly 114, the drive assembly 116, the controller 118, and the imaging system 120 and is adapted to cause the reagent manifold assembly 102, the actuator 105, the pump manifold assembly 112, the sample loading manifold assembly 114, the drive assembly 116, the controller 118, and the imaging system 120 to perform various functions as disclosed herein.

The reagent reservoir 108 has a body 124 defining a storage chamber 126, a sipper chamber 128, and a fluidic sinus 130 that fluidly couples the storage chamber 126 and the sipper chamber 128. The reagent reservoir 108 may alternatively be referred to as a reagent cartridge. The phrases "reagent reservoir" and "reagent cartridge" can, thus, be used interchangeably. The body 124 may be injection molded allowing the storage chamber 126 and the sipper chamber 128 to be produced as a unitary part. Other manufacturing techniques to produce the body 124 may be suitable, however. The reagent reservoir 108 also includes a fluidic port 132 that is fluidly coupled to the sipper chamber 128. The reagent reservoir 108 may additionally or alternatively be used with the system 900 of FIG. 12.

The fluidic interface 104 of the system 100 couples with the fluidic port 132 of the reagent reservoir 108 in operation to allow fluid to flow out of the sipper chamber 128. The actuator 105 can be associated with the fluidic interface 104 such that the actuator 105 moves the fluidic interface 104 of the system 100 to couple with the fluidic port 132 of the reagent reservoir 108. The actuator 105 can alternatively be associated with the reagent reservoir receptacle 106 such that the actuator 105 moves the reagent reservoir 108 to couple with the fluidic port 132 of the reagent reservoir 108.

The storage chamber 126 is shown containing reagent 133. The reagent 133 may be liquid reagent or dehydrated reagent (e.g., lyophilized reagent) to be rehydrated. The system 100 can flow and/or meter fluid into the storage chamber 126 and/or the sipper chamber 128 to rehydrate the reagent 133 if the reagent 133 is lyophilized reagent, for example.

The body 124 of the reagent reservoir 108 has a top surface 136 and a bottom surface 138 and the storage chamber 126 has an opening 140 at the top surface 136 and the sipper chamber 128 has an opening 142 at the top surface 136. The reagent reservoir 108 also has a lid 137 coupled to the body 124 that includes the fluidic port 132. The lid 137 is coupled to the top surface 136 in the implementation shown and covers the opening 140 of the storage chamber 26 and the opening 142 of the sipper chamber 128. The lid 137 may be sealed around the storage chamber 126 in some implementations to encourage the reagent 133 to follow a flow path from the storage chamber 126, through the fluidic sinus 130 and the sipper chamber 128 to the fluidic port 132. The lid 137 is sealed around the storage chamber 126 by laser welding in some implementations. The lid 137 can be coupled to the body 124 in different ways, however.

The body 124 of reagent reservoir 108 also includes a wall 143 positioned between the storage chamber 126 and the sipper chamber 128 and a stuffer 144 positioned within the sipper chamber 128. A surface 145 of the wall 143 facing the storage chamber 126 defines a portion of the storage chamber 126 and a surface 146 of the wall 143 facing the sipper chamber 128 defines a portion of the sipper chamber 128.

The stuffer 144 is used to reduce the volume of the sipper chamber 128 and defines a sipper channel 147 that fluidly couples the storage chamber 126 and the fluidic port 132 of the reagent reservoir 108. The stuffer 144 may extend past a distal end 148 of the wall 143 (see, for example, FIG. 4) to define a height of the sipper channel 147 between an end of the stuffer 144 and an inner-bottom surface of the body 124, for example. The top surface 136 of the body 124 is also shown defining a flow path 149 that fluidly couples the sipper channel 147 and the fluidic port 132. The lid 137 is sealed around the sipper chamber 128 and the flow path 149. The lid 137 as such is coupled to the top surface 136 of the body 124 and sealed around the storage chamber 126 and sealed around the sipper chamber 128, the flow path 149, and the fluidic port 132, for example.

Surfaces of the stuffer 144 and the surface 146 of the wall 143 define the sipper channel 147. The stuffer 144 may have a circular cross-section or another cross-section in such implementations to allow the sipper channel 147 to be defined. The stuffer 144 may alternatively define a groove such that the sipper channel 147 is an open channel. The groove may be U-shaped or have a different shape. The stuffer 144 can also define the sipper channel 147 through the stuffer 144 itself such that the sipper channel 147 is a closed channel. Put another way, the stuffer 144 alone may define the sipper channel 147 when the sipper channel 147 is a closed channel.

Referring still to the stuffer 144, the stuffer 144 may be coupled to the lid 137 or may be a separate component that is positioned within the sipper chamber 128. The stuffer 144 may be made of a resilient material such as rubber to allow the stuffer 144 to form an interference fit with surfaces 146 defining the sipper chamber 128, for example. The stuffer 144 may, however, be made of any other type of material and/or may be coupled within the sipper chamber 128 in different ways including a snap-fit connection or using another fastener, for example.

Referring back to the lid 137, the lid 137 is sealed to the body 124 of the reagent reservoir 108 around opening 142 of the sipper chamber 128, the flow path 149, and the fluidic port 132 by laser welding, in some implementations. The coupling between the lid 137 and the body 124 encourages fluid flow between the storage chamber 126, the fluidic sinus 130, the sipper chamber 128, and/or the sipper channel 147.

The reagent reservoir 108 also includes a fill port 150 on the bottom surface 138 of the body 124 and a cover 152 covering the fill port 150. The fill port 150 provides access to the storage chamber 126 and/or the sipper chamber 128 before the fill port 150 is covered by the cover 152 and after the lid 137 is coupled to the top surface 136 of the body 124, for example. The fill port 150 is a collar 154 in the implementation shown that allows the reagent reservoir 108 to be filled with the reagent 133. The cover 152 may be a foil or another impermeable. The collar 154 allows the cover 152 to be attached to the fill port 150 by methods that may include heating without damaging the storage chamber 126, the sipper chamber 128, and/or the body 124. The collar 154 may alternatively be omitted.

The system 100 can pressurize the storage chamber 126, in some implementations. The reagent 133 within the storage chamber 126 can thus be urged from the storage chamber 126 and out of the fluidic port 132 under positive pressure. The reagent manifold assembly 102 has a pneumatic interface 155 to do so and the reagent reservoir 108 has a pneumatic port 156. The pneumatic interface 155 of the system 100 couples with the pneumatic port 156 of the reagent reservoir 108 in operation to pressurize the storage chamber 126.

The reagent reservoir 108 may include a cover 157 covering the pneumatic port 156 and the system 100 may include a piercer 158 that pierces the cover 157. The cover 157 may be foil and the piercer 158 piercing the cover 157 may allow the pneumatic interface 155 to couple with the pneumatic port 156 and pressurize the reagent reservoir 108 or alternatively vent the reagent reservoir 108 to atmosphere. The cover 157 and the piercer 158 may alternatively be omitted.

A sample cartridge 159 carries one or more samples of interest (e.g., an analyte) in one or more sample wells 160 and is receivable in a sample cartridge receptacle 162. One or more sample sippers 164 of the sample sipper manifold assembly 115 are used to draw the samples from the one or more sample wells 160 and the sample is delivered to a flow cell 166 of the flow cell cartridge assembly 110 by sample fluidic lines 168. The sample wells 160 may be referred to as sample reservoirs. One of the sample fluidic lines 168 is coupled to each sample well 160 and the sample fluidic lines 168 are fluidly coupled to the flow cell 166 by, for example, the sample loading manifold assembly 114. The sample cartridge 159 also includes prime wells 170 and one or more wash wells 172 that may contain a wash buffer and/or a cleaning solution such as bleach.

The sample loading manifold assembly 114 includes one or more sample valves 174 and the pump manifold assembly 112 includes one or more pumps 176, one or more pump valves 178, and a cache 179. One or more of the valves 174, 178 may be implemented by a rotary valve, a pinch valve, a flat valve, a solenoid valve, a check valve, a piezo valve, a three-way valve, two-way valve, an electrically actuated valve, a pneumatically actuated valve, and combinations thereof. Other types of fluid control devices may prove suitable. One or more of the pumps 176 may be implemented by a syringe pump, a peristaltic pump, and/or a diaphragm pump. Other types of fluid transfer devices may prove suitable. The cache 179 may be a serpentine cache and may be adapted to receive a volume of about 4 milliliters (mL). The cache 179 may temporarily store one or more reaction components during, for example, bypass manipulations of the system 100 of FIG. 1. While the cache 179 is shown being included in the pump manifold assembly 112, the cache 179 may be located in a different location. The cache 179 may be included in the reagent manifold assembly 102 or in another location.

The sample sipper manifold assembly 115 in operation draws one or more samples from the sample cartridge 159 and the sample loading manifold assembly 114 and the pump manifold assembly 112 flow the one or more samples of interest from the sample cartridge 159 through the fluidic line 168 toward the flow cell cartridge assembly 110. The flow cell cartridge assembly 110 includes the flow cell 166 having a plurality of channels (e.g., two channels, four channels, eight channels). The flow cell 166, however, may have a single channel or the flow cell 166 may be omitted and/or replaced with another detection device. The sample loading manifold assembly 114 may be adapted to individually load/address each channel of the flow cell 166 with a sample of interest automatically using the system 100 of FIG. 1.

The sample cartridge 159 and the sample sipper manifold assembly 115 are positioned downstream of the flow cell cartridge assembly 110. The sample loading manifold assembly 114 may thus load a sample of interest into the flow cell 166 from the rear of the flow cell 166. Loading a sample of interest from the rear of the flow cell 166 may be referred to as "back loading" and may reduce contamination. The sample loading manifold assembly 114 is coupled between the flow cell cartridge assembly 110 and the pump manifold assembly 112.

The pumps 176 draw the hybridization buffer through the flow cell 166 to prime the system 100 with, for example, the hybridization buffer and/or to remove air from the system 100 and the sample sipper manifold assembly 115 dispenses the hybridization buffer into the prime wells 170 once the system 100 is primed. The sample of interest is thereafter drawn from the sample cartridge 159 and the sample valves 174, the pump valves 178, and/or the pumps 176 selectively actuate to urge the sample of interest toward the pump manifold assembly 112. The sample cartridge 159 is shown including the sample wells 160 that are selectively fluidically accessible via corresponding sample sippers 164. Each sample can thus be selectively isolated from other samples using the corresponding sample sippers 164 and the corresponding sample valves 174.

A sample valve 174 for the corresponding sample of interest can be opened or released to fluidically connect the sample well 160 to an instrument fluidics system to draw the sample of interest from one of the sample wells 160. A corresponding pump 176 of the pump manifold assembly 112 can be actuated to draw the sample of interest from the sample well 160 and into a fluidic line, such as a fluidic line of the pump manifold assembly 112 and/or another fluidic line. A corresponding pump valve 178 can be opened, closed, and/or moved from a first position to a second position to fluidly couple the corresponding pump 176 to the fluidic line for the corresponding sample well 160. The pump valve 178 can be selectively isolated from other pumps 176 and/or pump valves 178 and a sample of interest can be temporarily stored in a line volume between a pump valve 178 and/or a sample valve 174 and a corresponding pump 176 in some implementations.

The sample valves 174, the pump valves 178, and/or the pumps 176 may be selectively actuated to urge the sample of interest toward the flow cell cartridge assembly 110 and into the respective channels of the flow cell 166 to individually flow the sample of interest toward a corresponding channel or channels of the flow cell 166 and away from the pump manifold assembly 112. After the sample of interest is aspirated into a line volume for instance, the sample valve 174 can be closed, thereby fluidically disconnecting the sample wells 160 from the line volume. The sample valve 174 may be moved from a first position to a second position in some instances to fluidically couple the corresponding pump 176 to the corresponding channel or channels via the sample loading manifold assembly 114. The pump 176 can then push the sample of interest into the corresponding channel or channel of the flow cell 166. A corresponding pump valve 178 may be opened, closed, and/or moved from a second position to a first position in some implementations to fluidically couple the corresponding pump 176 to the corresponding channel or channels. Each channel of the plurality of channels of the flow cell 166 receives the sample of interest in some implementations and one or more of the channels may selectively receive the sample of interest and others of the channels may not receive the sample of interest. The channels of the flow cell 166 that may not be receive the sample of interest may receive a wash buffer instead, for example.

The drive assembly 116 interfaces with the reagent manifold assembly 102 and the pump manifold assembly 112 to flow one or more reagents that interact with the sample at the flow cell 166 through the flow cell cartridge assembly 110. In an implementation, a reversible terminator with an identifiable label is attached to the reagent to allow a single nucleotide to be incorporated by the sstDNA per cycle. In some such implementations, one or more of the nucleotides has a unique fluorescent label that emits a color when excited. The color (or absence thereof) is used to detect the corresponding nucleotide. The imaging system 120 is adapted to excite one or more of the identifiable labels (e.g., a fluorescent label) and thereafter obtain image data for the identifiable labels in the implementation shown. The labels may be excited by incident light and/or a laser and the image data may include one or more colors emitted by the respective labels in response to the excitation. The image data (e.g., detection data) may be analyzed by the system 100. The imaging system 120 may be a fluorescence spectrophotometer including an objective lens and/or a solid-state imaging device. The solid-state imaging device may include a charge coupled device (CCD) and/or a complementary metal oxide semiconductor (CMOS).

The drive assembly 116 interfaces with the reagent manifold assembly 102 and the pump manifold assembly 112 after the image data is obtained in some implementations to flow another reaction component (e.g., a reagent) through the flow cell 166 that is thereafter received in the waste reservoir 122 via a fluidic line 180 and/or otherwise exhausted by the system 100. Some reaction components perform a flushing operation that chemically cleaves the fluorescent label and the reversible terminator from the sstDNA. The sstDNA is then ready for another cycle. The sample sippers 164 are cleaned between runs of the system 100 in some implementations by dipping the sample sippers 164 in the wash wells 172 containing a cleaning solution such as bleach or a wash buffer. The cleaning solution is removable by dipping the sample sippers 164 in the prime wells 170 containing the hybridization buffer. Other approaches of cleaning the sample sippers 164 may be suitable however.

The fluidic line 180 is coupled between the pump manifold assembly 112 and the waste reservoir 122. The pumps 176 and/or the pump valves 178 of the pump manifold assembly 112 selectively flow the reaction components from the flow cell cartridge assembly 110, through the sample fluidic line 168 and the sample loading manifold assembly 114 to the fluidic line 180.

The flow cell cartridge assembly 110 is receivable in the flow cell receptacle 109 and is couplable with a flow cell interface 181. The flow cell receptacle 109 may, however, be excluded and the flow cell cartridge assembly 110 may be directly coupled to the flow cell interface 181. While one flow cell interface 181 and one flow cell cartridge 110 are shown, the system 100 may include more than one flow cell interface 181 (e.g., 2, 3, 4) and related components and the flow cell interfaces 181 can receive a corresponding number of flow cell cartridge assemblies 110.

The flow cell cartridge assembly 110 is coupled to a central valve 182 via the flow cell interface 181. An auxiliary waste fluidic line 183 is coupled to the central valve 182 and to the waste reservoir 122. The auxiliary waste fluidic line 183 in some implementations is adapted to receive any excess fluid of a sample of interest from the flow cell cartridge assembly 110, via the central valve 182, and to flow the excess fluid of the sample of interest to the waste reservoir 122 when back loading the sample of interest into the flow cell 166, as described herein. That is, the sample of interest may be loaded from the rear of the flow cell 166 and any excess fluid for the sample of interest may exit from the front of the flow cell 166. Different samples can be separately loaded to corresponding channels of the flow cell 166 by back loading samples of interest into the flow cell 166 and a single manifold can couple the front of the flow cell 166 to the central valve 182 to direct excess fluid of each sample of interest to the auxiliary waste fluidic line 183 and reduce the likelihood of contamination of samples between channels of the flow cell 166. The single manifold can be used for delivering common reagents from the front of the flow cell 166 (e.g., upstream) to each channel of the flow cell 166 and common reagents may exit the flow cell 166 from the rear of the flow cell 166 (e.g., downstream). Put another way, the sample of interest and the reagents may flow in opposite directions through the channels of the flow cell 166.

The reagent manifold assembly 102 in the implementation shown includes a shared line valve 184 and a bypass valve 186. The shared line valve 184 may be referred to as a reagent selector valve. The central valve 182 and the valves 184, 186 of the reagent manifold assembly 102 may be selectively actuated to control the flow of fluid through fluidic lines 168, 180, 183. One or more of the valves 182, 184, 186 may be implemented by a rotary valve, a pinch valve, a flat valve, a solenoid valve, a check valve, a piezo valve, etc. Other fluid control devices may prove suitable.

The reagent manifold assembly 102 may be coupled to a corresponding number of the reagents reservoirs 108 and/or storage chambers 126 of one of the reagent reservoirs 108 via a corresponding sipper chamber 128. The reagent reservoirs 108 may contain the reagent 133 or another fluid and/or another reaction component. The reagent manifold assembly 102 includes the fluidic interface 104 and the pneumatic interface 155 that connect to the fluidic port 132 and the pneumatic port 156 of the reagent reservoirs 108 to flow fluid into the reagent manifold assembly 102 of the system 100 under positive and/or negative pressure.

The shared line valve 184 of the reagent manifold assembly 102 is coupled to the central valve 182 via a shared reagent fluidic line 188 in the implementation shown. Different reagents may flow through the shared reagent fluidic line 188 at different times. The pump manifold assembly 112 may draw wash buffer through the shared reagent fluidic line 188, the central valve 182, and the flow cell cartridge assembly 110 when performing a flushing operation before changing between one reagent and another. The shared reagent fluidic line 188 may thus be involved in the flushing operation. While one shared reagent fluidic line 188 is shown, any number of shared fluidic lines may be included in the system 100.

The bypass valve 186 of the reagent manifold assembly 102 is coupled to the central valve 182 via dedicated reagent fluidic lines 190, 192. The central valve 182 may have one or more dedicated ports that correspond to the dedicated reagent fluidic lines 190, 192 and each of the dedicated reagent fluidic lines 190, 192 may be associated with a single reagent. The fluids that flow through the dedicated reagent fluidic lines 190, 192 may be used during sequencing operations and may include a cleave reagent, an incorporation reagent, a scan reagent, a cleave wash, and/or a wash buffer. The reagent manifold assembly 102 may thus draw wash buffer through the central valve 182 and/or the flow cell cartridge assembly 110 when performing a flushing operation before changing between one reagent and another in association with the bypass valve 186. The dedicated reagent fluidic lines 190, 192 themselves, however, may not be flushed because only a single reagent may flow through each of the dedicated reagent fluidic lines 190, 192. The approach of including dedicated reagent fluidic lines 190, 192 may be advantageous when the system 100 uses reagents that may have adverse reactions with other reagents. Reducing a number of fluidic lines or length of the fluidic lines that are flushed when changing between different reagents reduces reagent consumption and flush volume and may decrease cycle times of the system 100, moreover. While two dedicated reagent fluidic lines 190, 192 are shown, any number of dedicated fluidic lines may be included in the system 100.

The bypass valve 186 is also coupled to the cache 179 of the pump manifold assembly 112 via a bypass fluidic line 194. One or more reagent priming operations, hydration operations, mixing operations, and/or transfer operations may be performed using the bypass fluidic line 194. The priming operations, the hydration operations, the mixing operations, and/or the transfer operations may be performed independent of the flow cell cartridge assembly 110. The operations using the bypass fluidic line 194 may thus occur during, for example, incubation of one or more samples of interest within the flow cell cartridge assembly 110. That is, the shared line valve 184 can be utilized independently of the bypass valve 186 such that the bypass valve 186 can utilize the bypass fluidic line 194 and/or the cache 179 to perform one or more operations while the shared line valve 184 and/or the central valve 182 simultaneously, substantially simultaneously, or offset synchronously perform other operations. Performing multiple operations using the system 100 at once may reduce run time. The bypass valve 186 and the bypass fluidic line 194 can be used to flow hybridization buffer through the pump manifold assembly 112 to the sample loading manifold assembly 114 and allow the hybridization buffer to follow the sample of interest through the flow cell 166. The order of fluid flowing through the flow cell 166 may thus be: 1) hybridization buffer from the priming operation; 2) the sample drawn from the sample wells 160 via the sample sippers 164; and 3) the hybridization buffer accessed via the bypass valve 186 and the bypass fluidic line 194.

Referring now to the drive assembly 116, in the implementation shown, the drive assembly 116 includes a pump drive assembly 196 and a valve drive assembly 198. The pump drive assembly 196 may be adapted to interface with the one or more pumps 176 to pump fluid through the flow cell 166 and/or to load one or more samples of interest into the flow cell cartridge assembly 110. The valve drive assembly 198 may be adapted to interface with one or more of the valves 178, 182, 184, 186 to control the position of the corresponding valves 178, 182, 184, 186. The shared line valve 184 and/or the bypass valve 186 are rotary valves in an implementation having a first position that blocks flow to the flow cell 166 and a second position that allows flow from the reagent reservoir 108 to the flow cell 166. Either of the valves 184, 186, however, may be positioned in any number of positions to flow any one or more of a first reagent, a buffer reagent, a second reagent, etc. to the flow cell cartridge assembly 110. The bypass valve 186 may be rotated as an example between a first position allowing fluid flow from one or more of the reagent reservoirs 108, through the bypass valve 186, and to the central valve 182 and a second position allowing fluid flow from one or more of the reagent reservoirs 108, through the bypass valve 186, and into the bypass fluidic line 194. Other arrangements may prove suitable. The bypass valve 186 may be positionable to allow fluid flow from the bypass fluidic line 194, through the bypass valve 186, and to a mixing reservoir of the reagent reservoirs 108 for example.

Referring to the controller 118, in the implementation shown, the controller 118 includes a user interface 200, a communication interface 202, one or more processors 204, and a memory 206 storing instructions executable by the one or more processors 204 to perform various functions including the disclosed implementations. The user interface 200, the communication interface 202, and the memory 206 are electrically and/or communicatively coupled to the one or more processors 204.

The user interface 200 is adapted in an implementation to receive input from a user and to provide information to the user associated with the operation of the system 100 and/or an analysis taking place. The user interface 200 may include a touch screen, a display, a keyboard, a speaker(s), a mouse, a track ball, and/or a voice recognition system. The touch screen and/or the display may display a graphical user interface (GUI).

The communication interface 202 is adapted in an implementation to enable communication between the system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records and/or a protocol(s) to be executed by the system 100.

The one or more processors 204 and/or the system 100 may include one or more of a processor-based system(s) or a microprocessor-based system(s). In some implementations, the one or more processors 204 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit and/or another logic-based device executing various functions including the ones described herein.

The memory 206 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache, and/or any other storage device or storage disk in which information is stored for any duration (e.g., permanently, temporarily, for extended periods of time, for buffering, for caching).

Figure 2:
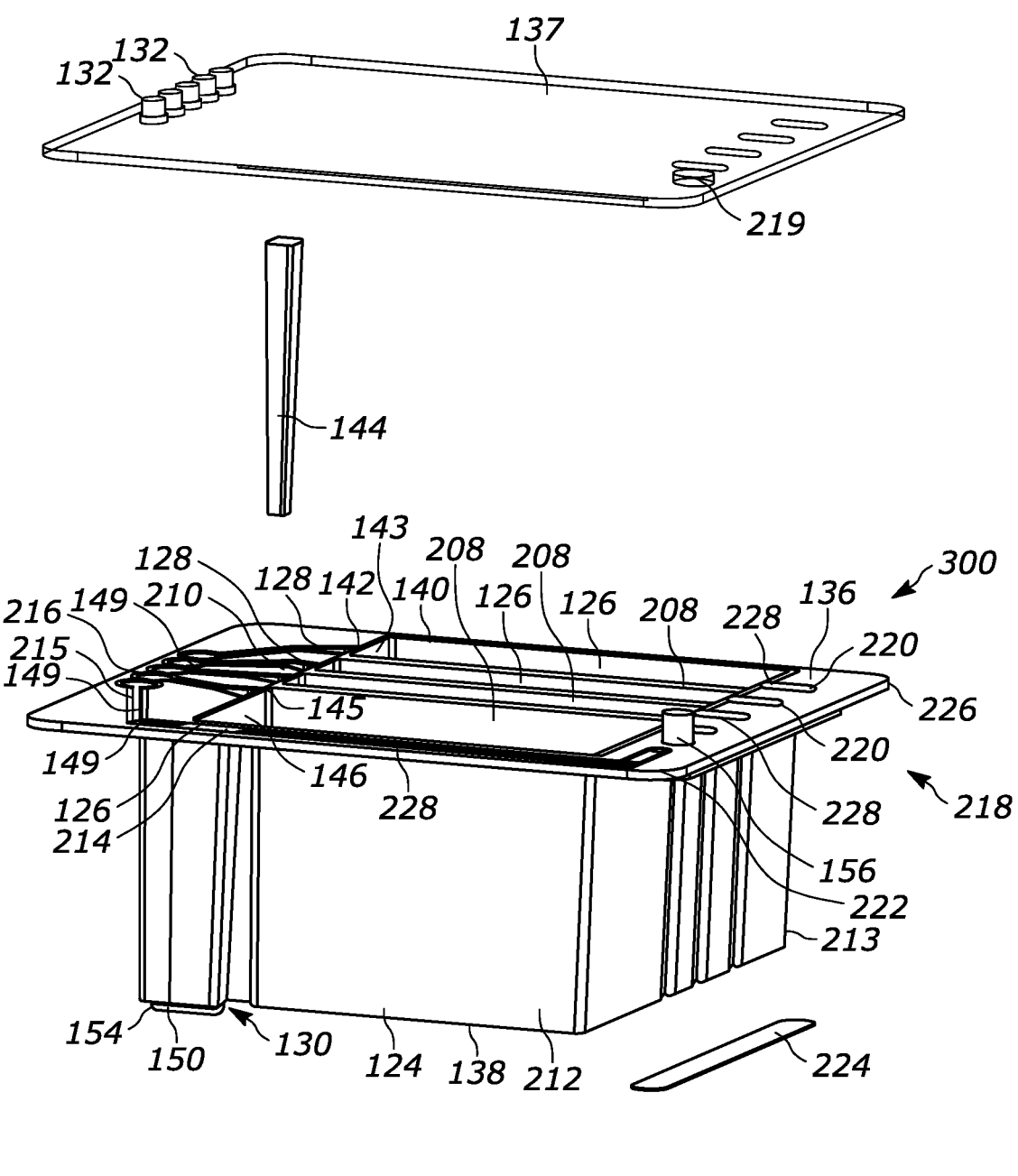
FIG. 2 illustrates an expanded isometric view of an implementation of a reagent reservoir that can be used to implement the reagent reservoir of FIG. 1 and/or the liquid reservoir of FIG. 12.
Figure 4:
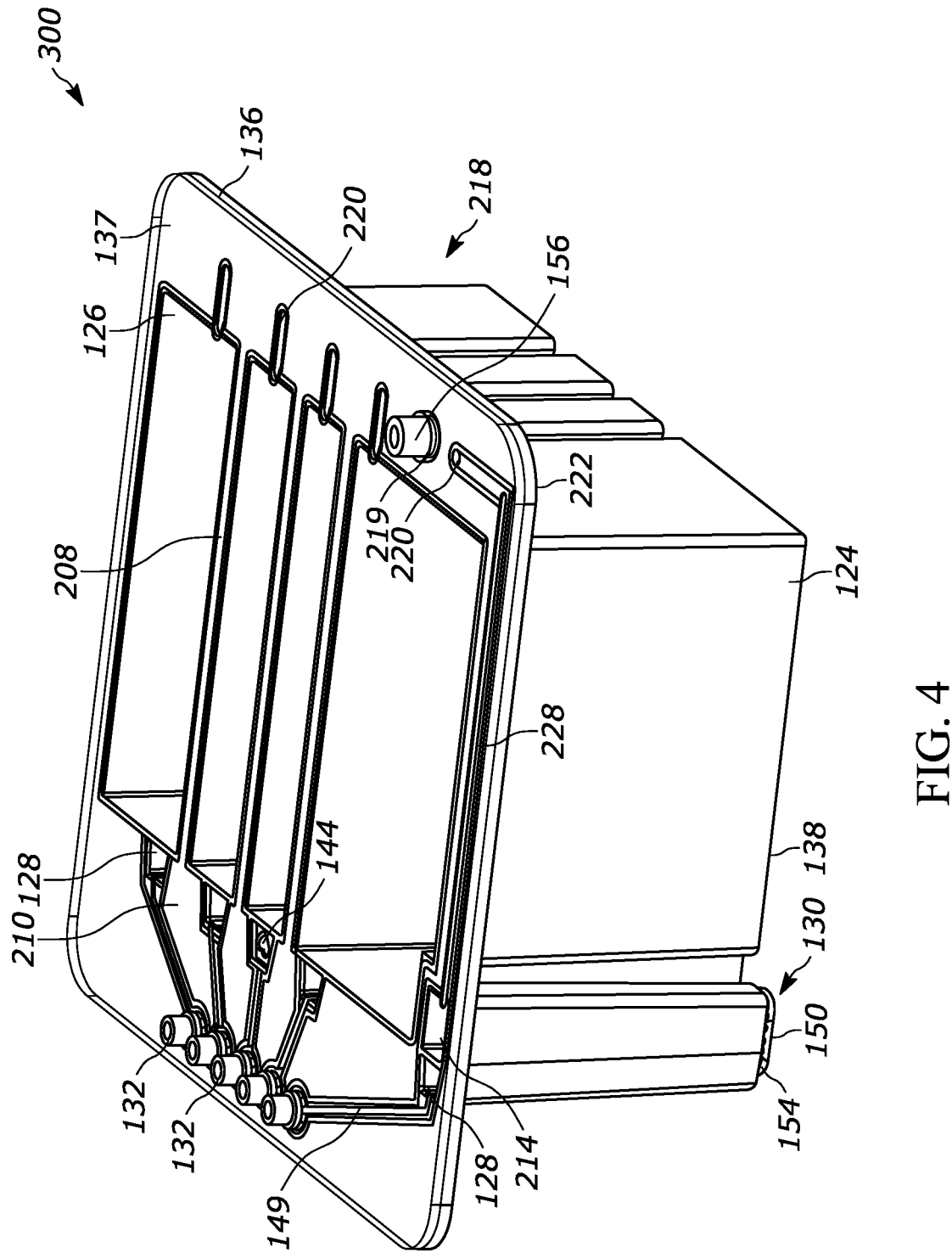
FIG. 4 is an isometric top view of the reagent reservoir of FIG. 2.
Figure 13:
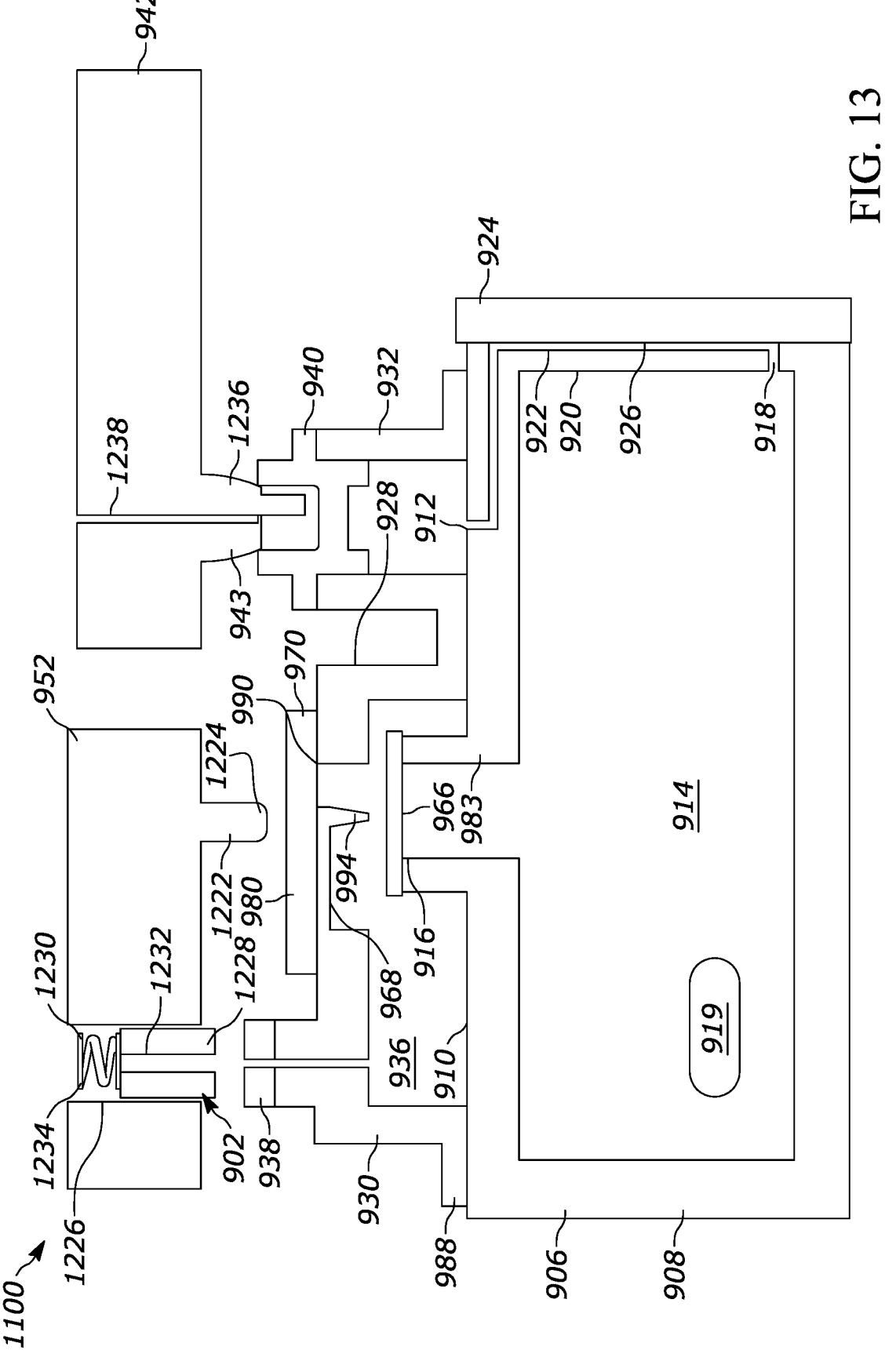
FIG. 13 illustrates a schematic diagram of an example implementation of a system, a liquid reservoir, and a cartridge assembly that can be used to implement the system, the liquid reservoir, and the liquid reservoir of FIG. 12.

FIG. 2 illustrates an expanded isometric view of an implementation of a reagent reservoir 300 that can be used to implement the reagent reservoir 108 of FIG. 1 and/or the liquid reservoir 906 of FIG. 13. The reagent reservoir 300 has the body 124 defining a plurality of storage chambers 126, a plurality of sipper chambers 128, and the stuffer 144 that is not coupled to the lid 137 in the implementation shown. The stuffer 144 may be retained within the sipper chamber 128 by an interference fit or by the lid 137, for example. The stuffer 144 may alternatively be coupled to the lid 137 as shown in FIG. 4.

Each of the storage chambers 126 and the sipper chambers 128 have a corresponding fluidic sinus 130 that couples the storage chambers 126 and the sipper chambers 128. The reagent reservoir 300 is shown having five storage chambers 126, five corresponding sipper chambers 128 and a corresponding number of fluidic ports 132 carried by the lid 137. A different number of the storage chambers 126 and/or the sipper chambers 128 may, however, be included and any one of the storage chambers 126 may or may not be pressurized. The reagent 133 may flow from the pressurized storage chambers 126 under positive pressure and the reagent 133 may flow from the non-pressurized storage chamber 126 under negative pressure.

The body 124 of the reagent reservoir 108 includes internal storage chamber walls 208 that separate the storage chambers 126 and internal sipper chamber walls 210 that separate the sipper chambers 128. The body 124 of the reagent reservoir 108 also includes external walls 212, 213 that define the storage chambers 126. The storage chambers 126 defined by the external walls 212, 213 in the implementation shown are shown being a first size, the storage chambers 126 positioned between the storage chambers 126 and defined by the internal storage chamber walls 208 are shown being a second size, and a storage chamber 214 is a third size. The first size is larger than the second size and the third size is smaller than the first size and the second size. The storage chambers 126, 214 may, however, be different sizes than shown and the storage chambers 126 may all be the same or similar sizes and/or the storage chambers 126 may be different sizes.

The reagent reservoir 300 of FIG. 2 also shows the top surface 136 of the body 124 defining the flow path 149 that fluidly couples the sipper chamber 128 and the corresponding fluidic port 132. The top surface 136 and the lid 137 collectively may define the flow paths 149 when the lid 137 is coupled to the top surface 136 of the body 124. The top surface 136 may define grooves 215 and include corresponding fluidic port areas 216 that define the flow paths 149. The flow paths 149 terminate at the fluidic port area 216 and the fluidic ports 132 carried by the lid 137 are aligned with the corresponding fluidic port areas 216 when the lid 134 is attached to the body 124. The fluidic port areas 216 may be chambers 217 (see, for example, FIG. 3) that collect fluid and deter the fluid from flowing back into the sipper chamber 128.

The reagent reservoir 300 also includes the pneumatic port 156 and a pneumatic manifold 218. The pneumatic port 156 is shown integrally formed with the body 124. The pneumatic port 156 may, however, be coupled to the lid 137. The lid 137 defines an aperture 219 through which the pneumatic port 156 extends when the lid 137 is coupled to the body 124.

The pneumatic manifold 218 fluidly couples the pneumatic port 156 to each of the storage chambers 126 to allow the storage chambers 126 to be pressurized. The pneumatic manifold 218 may alternatively not be coupled to each of the storage chambers 126 or the pneumatic manifold 218 may be omitted.

The pneumatic manifold 218 includes manifold ports 220 defined through a lip 222 of the body 124 of the reagent reservoir 108 and an impermeable cover 224 that can be coupled to a lower surface 226 of the lip 222 in the implementation shown. The pneumatic manifold 218 also has channels 228 defined by the top surface 136 of the body 124. Each channel 228 couples one of the manifold ports 220 and a corresponding storage chamber 126 and the pneumatic port 156 is fluidly coupled to each of the manifold ports 220 by a flow path defined between the lower surface 226 of the lip 222 and the impermeable cover 224. The impermeable cover 224 may be foil and may be pierced by the system 100 to vent the storage chambers 126 to atmosphere. The pneumatic manifold 218 is also shown including an elastomer cover 230 that can be coupled to the lower surface 226 of the lip 22 and cover the impermeable cover 224. The reagent reservoir 300 may alternatively be provided with vents that provide fluidic access between the storage chamber 126 and atmosphere. Fluid may be drawn through the sipper chamber 128/sipper channels 147 in this manner without using pressurized fluidics. The pneumatic manifold 218 may be omitted in such implementations. While the pneumatic manifold 218 is shown including a number of components, one or more of the components may be omitted, additional components may be added, and/or the pneumatic manifold 218 may be implemented in different ways.

Figure 3:
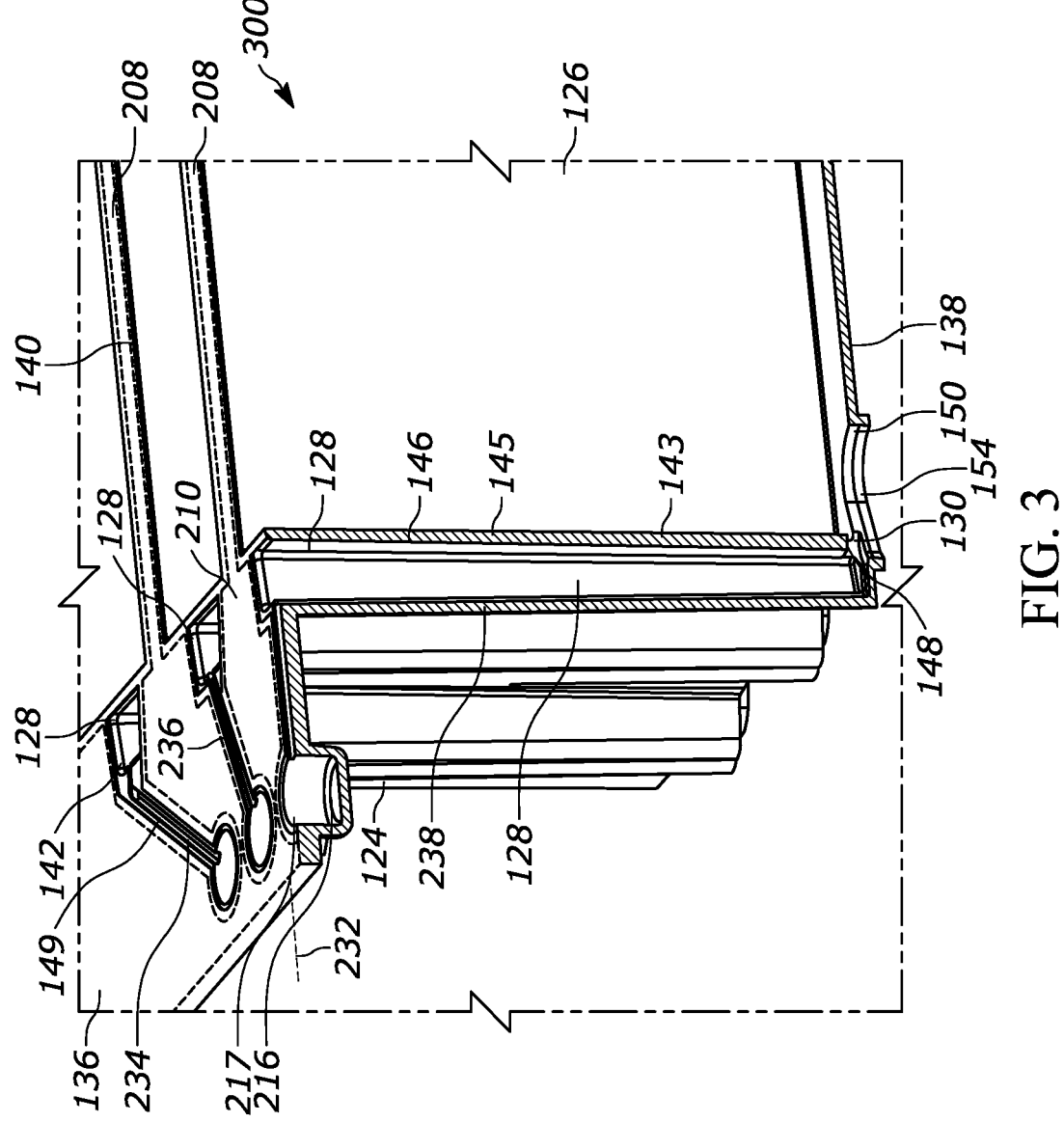
FIG. 3 illustrates a detailed cross-sectional isometric view of the reagent reservoir of FIG. 2.

FIG. 3 illustrates a detailed cross-sectional isometric view of the reagent reservoir 300 of FIG. 2. The body 124 of the reagent reservoir 300 includes the internal storage chamber walls 208 that separate the storage chambers 126, the sipper chamber walls 210 that separate the sipper chambers 128, and the flow paths 149 that are fluidly connected to the sipper chambers 128. The flow paths 149 are shown including the fluidic port areas 216 having corresponding chambers 217 that are cylindrical. The chamber 217 may, however, be different shapes and/or sizes. The fluidic port areas 216 are shown relatively equally spaced apart and grouped toward a central longitudinal axis 232 of the body 124. Some of the flow paths 149 include legs 234, 236 that taper from the sipper chambers 128 to the corresponding fluidic port area 216.

The body 124 of the reagent reservoir 300 also includes the wall 143 positioned between the storage chamber 126 and the sipper chamber 128 and an end wall 238 that also defines the sipper chamber 128. The wall 143 has the distal end 148 that partially defines the fluidic sinus 130. The stuffer 144 is not shown positioned within the sipper chamber 128. The stuffer 144 may, however, be positioned within the sipper chamber 128 and define the sipper channel 147.

The end wall 238 tapers from the top surface 136 of the body 124 to the fluidic sinus 130. The sipper chamber 128 is thus shown having a wedge shape that may encourage the stuffer 144 to form an interference fit with the body 124 when the stuffer 144 is positioned within the sipper chamber 128. The sipper chamber 128 may, however, be different shapes and/or sizes.

FIG. 4 is an isometric top view of the reagent reservoir 300 of FIG. 2. The stuffer 144 is shown positioned in one of the sipper chambers 128 and no stuffer 144 is shown positioned in the other sipper chambers 128. Stuffers 144 may, however, be positioned in more than one of the sipper chambers 128 or in none of the sipper chambers 128.

The top surface 136 of the body 124 and the lid 137 define the flow paths 149 that fluidly couple the sipper chambers 128 and the fluidic ports 132 and also define the channels 228 that couple the manifold ports 220 of the pneumatic manifold 218 to the corresponding storage chambers 126 in the implementation shown. The lid 137 in FIG. 4 is shown being transparent or translucent. The lid 137 may, however, be opaque. The lid 137 is sealed around each of the sipper chambers 128 and the flow path 149 and around the manifold ports 220 and the channels 228. The lid 137 may be sealed to the body 124 by laser welding.

Figure 5:
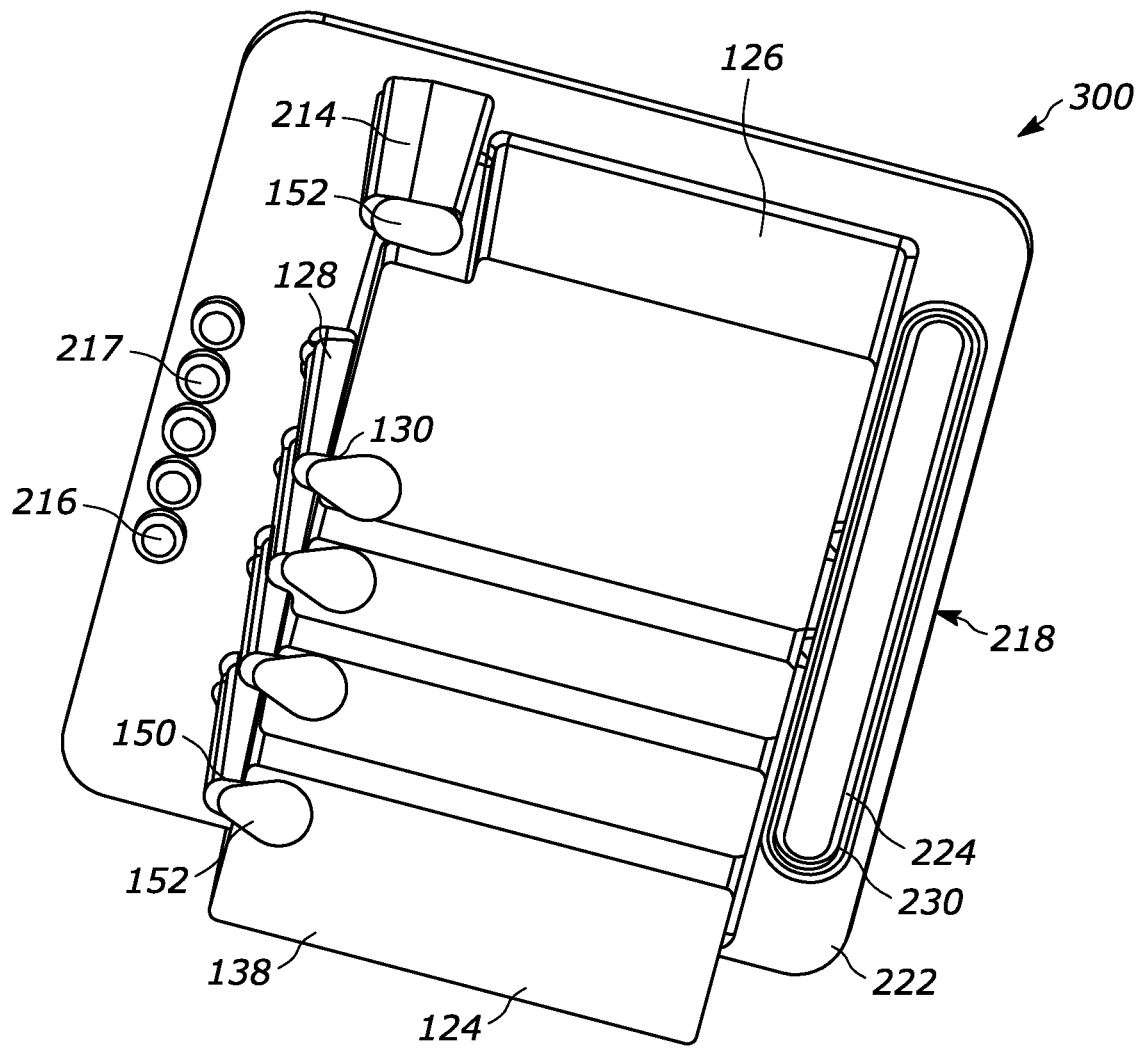
FIG. 5 is an isometric bottom view of the reagent reservoir of FIG. 3.

FIG. 5 is an isometric bottom view of the reagent reservoir 300 of FIG. 3. The reagent reservoir 300 includes the pneumatic manifold 218 that fluidly couples the pneumatic port 156 and the storage chambers 126 and the covers 152 that cover the fill ports 150. The fill ports 150 are shown being teardrop shaped. The fill ports 150 may, however may be different shapes (see the fill port 150 of FIG. 9, for example).

Figure 6:
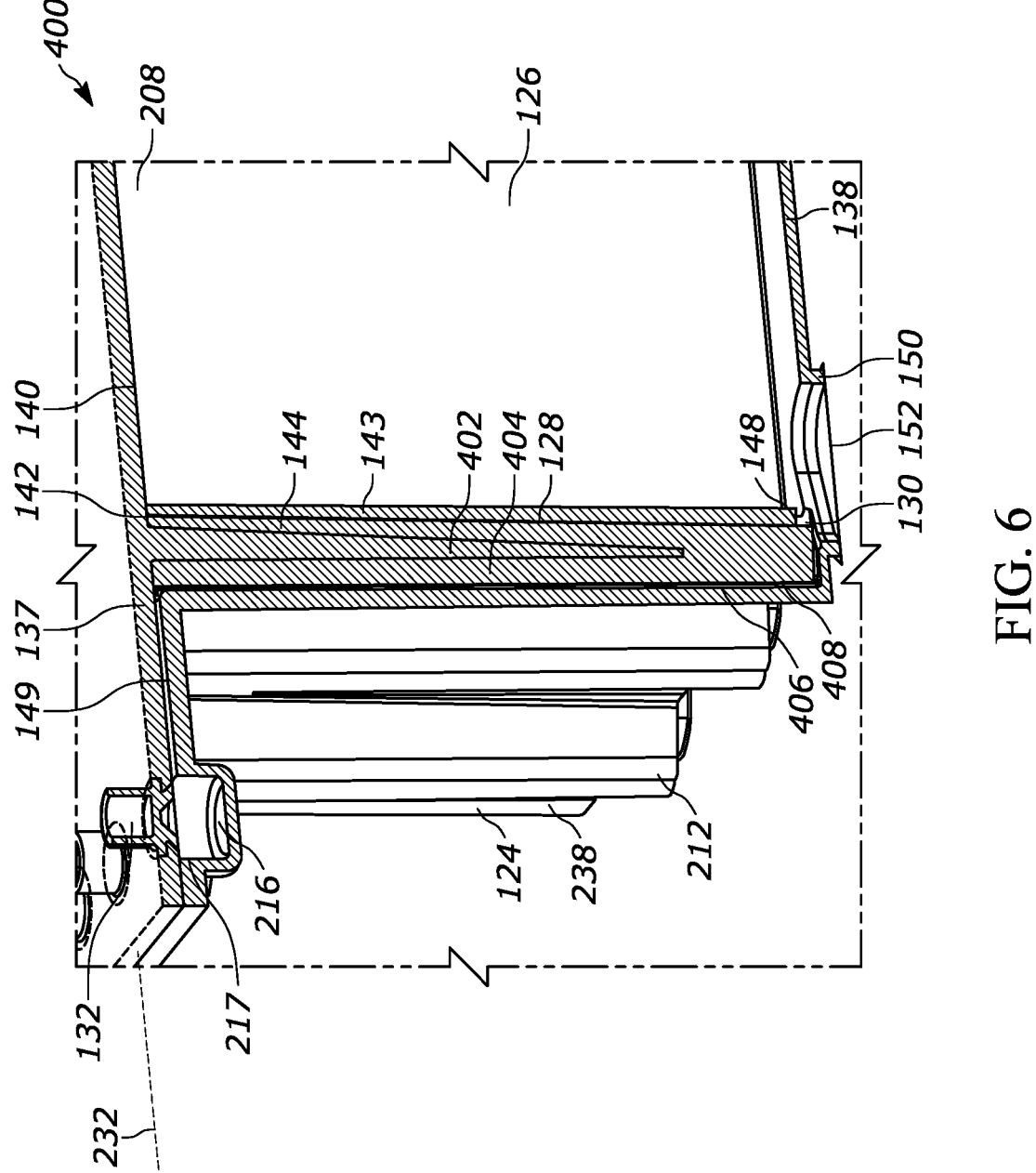
FIG. 6 shows a detailed isometric cross-sectional view of another reagent reservoir that can be used to implement the reagent reservoir of FIG. 1.

FIG. 6 shows a detailed isometric cross-sectional view of another reagent reservoir 400 that can be used to implement the reagent reservoir 108 of FIG. 1. The reagent reservoir 400 of FIG. 6 is the same as the reagent reservoir 300 of FIG. 2. The reagent reservoir 400 of FIG. 6, however, includes the stuffer 144 coupled to the lid 137 instead of the stuffer 144 not being coupled to the lid 137 as shown in FIG. 2. The stuffer 144 includes a core 402 that is integral with the lid 137 and an exterior elastomer 404 that is secured around the core 402. The stuffer 144 may alternatively be coupled to the lid 137 by adhesive or a standard fastening mechanism, such as a screw in other implementations.

The stuffer 144 extends past the distal end 148 of the wall 143 in the implementation shown. The stuffer 144 has a cross-section that allows the sipper channel 147 to be defined and that also corresponds to a cross-section of the sipper chamber 128. The stuffer 144 here is a tetrahedron. The stuffer 144 can have another cross section such as being circular. The stuffer 144 may alternatively define a groove that faces the end wall 238 of the body 124 such that the sipper channel 147 is an open channel meaning that the sipper channel 306 is formed by both the surfaces 408 of the stuffer 144 and the internal surfaces 304 of the body 124.

Figure 7:
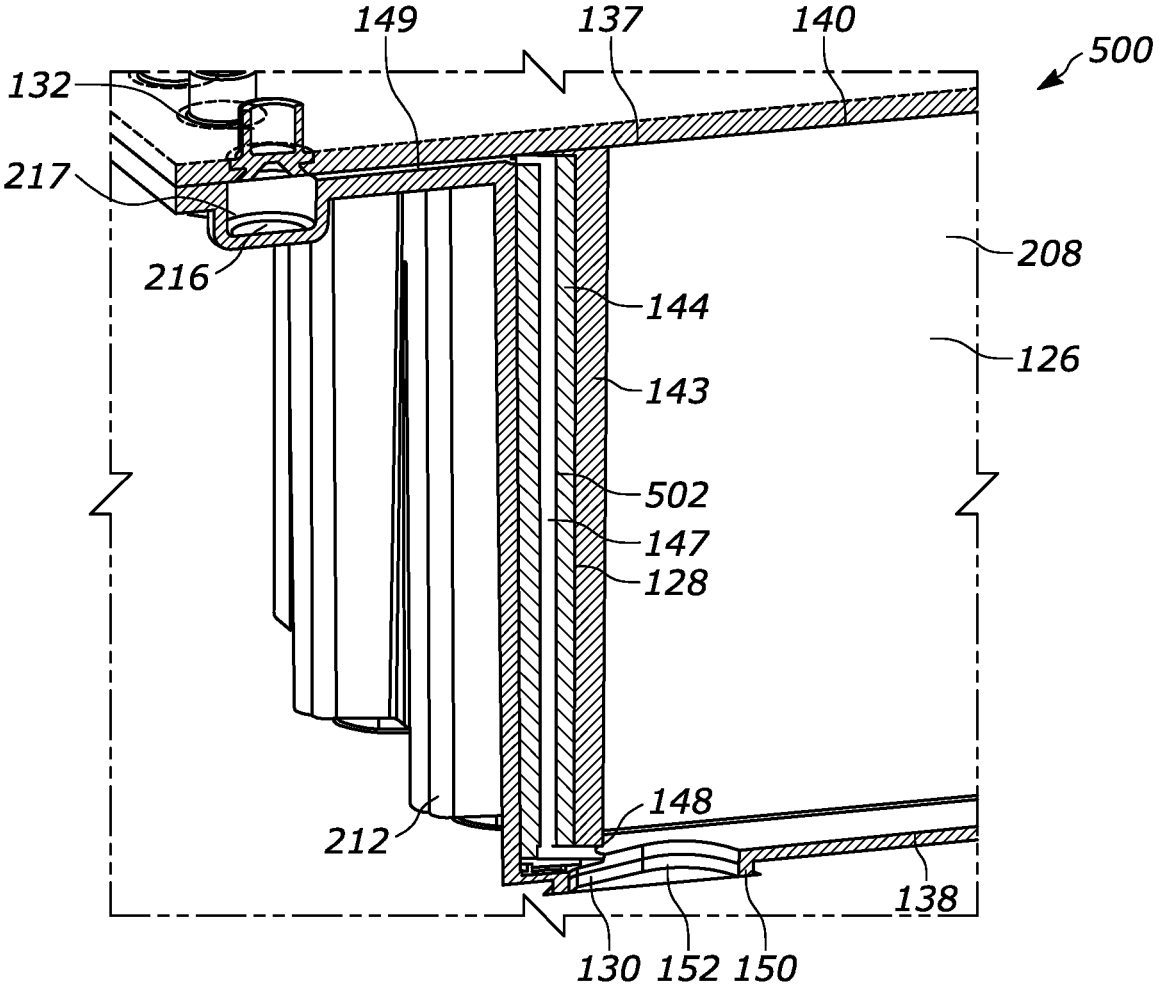
FIG. 7 shows a detailed isometric cross-sectional view of another reagent reservoir that can be used to implement the reagent reservoir of FIG. 1.

FIG. 7 shows a detailed isometric cross-sectional view of another reagent reservoir 500 that can be used to implement the reagent reservoir 108 of FIG. 1. The reagent reservoir 500 of FIG. 7 is the same as the reagent reservoirs 300 of FIG. 2. The reagent reservoir 500 of FIG. 7, however, has the stuffer 144 defining the sipper channel 147 through the stuffer 144. The sipper channel 147 as a result is a closed channel meaning that most or all of the sipper channel 147 is formed only by internal surfaces 502 of the stuffer 144. The stuffer 144 operates as a straw with the sipper channel 147 through the middle of the stuffer 144. The stuffer 144 may, however, define the sipper channel 147 in different locations. The stuffer 144 may not be coupled to the lid 137 in the implementation shown and but instead may be coupled to the body 124 by standard fastening mechanisms, adhesive, or a friction fit.

Figure 8:
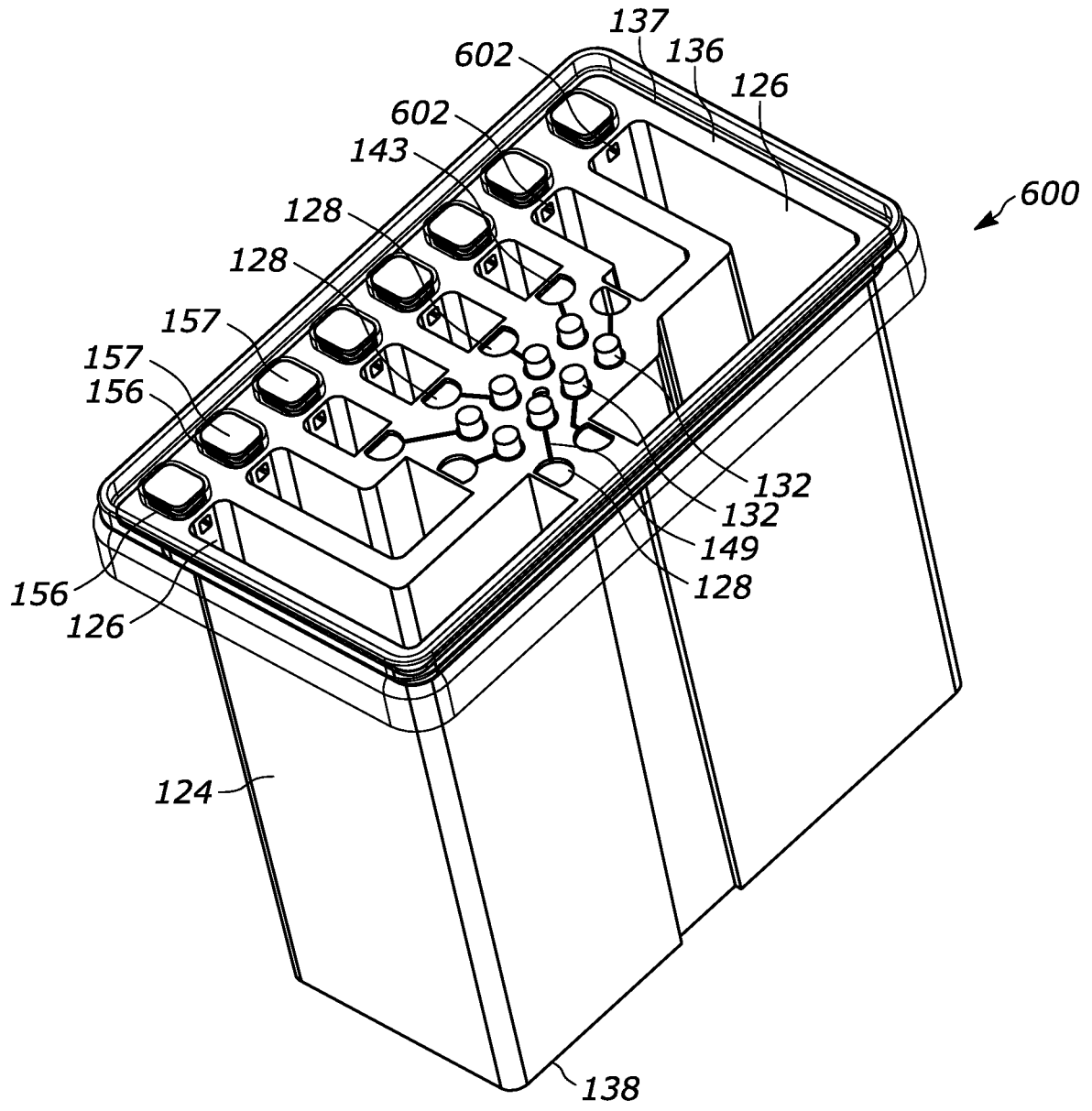
FIG. 8 shows an isometric top view of another reagent reservoir that can be used to implement the reagent reservoir of FIG. 1.

FIG. 8 shows an isometric top view of another reagent reservoir 600 that can be used to implement the reagent reservoir 108 of FIG. 1. The reagent reservoir 600 of FIG.

8 is similar to the reagent reservoirs 300, 400, 500 disclosed above. The reagent reservoir 600 in contrast, however, includes eight storage chambers 126, eight sipper chambers 128 and a corresponding number of the fluidic ports 132. Each storage chamber 126 of the reagent reservoir 600 of FIG. 8 has a corresponding pneumatic port 156 that is covered by the cover 157. The pneumatic ports 156 are shown coupled to the storage chambers 126 by corresponding fluidic couplings 602. The covers 157 can be pierced by the piercer 158 of the system 100 in operation to pressurize the reagent reservoir 108 and/or vent the corresponding storage chambers 126 to atmosphere.

Figure 9:
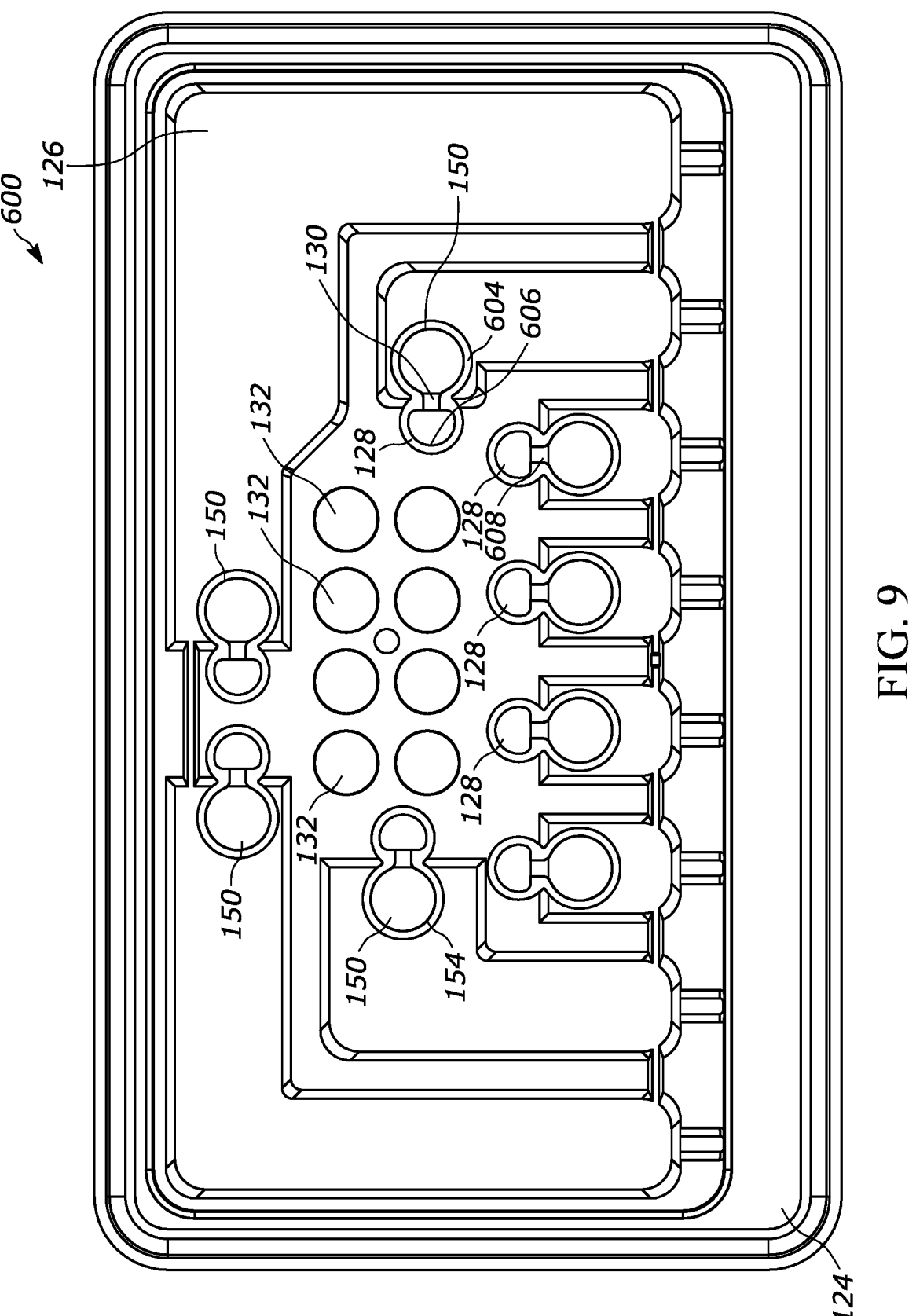
FIG. 9 is a plan bottom view of the reagent reservoir of FIG. 8 that omits the covers covering the fill ports.

FIG. 9 is a plan bottom view of the reagent reservoir 600 of FIG. 8 that omits the covers 152 covering the fill ports 150. The fill ports 150 are shown having a shape similar to the numeral eight and include a first portion 604 that provides access to the storage chamber 126 and a second portion 606 that provides access to the sipper chamber 128. The fluidic sinus 130 is a groove 608 that extends between the first portion 604 and the 606 and fluidly couples the storage chamber 126 and the sipper chamber 128.

Figure 10:
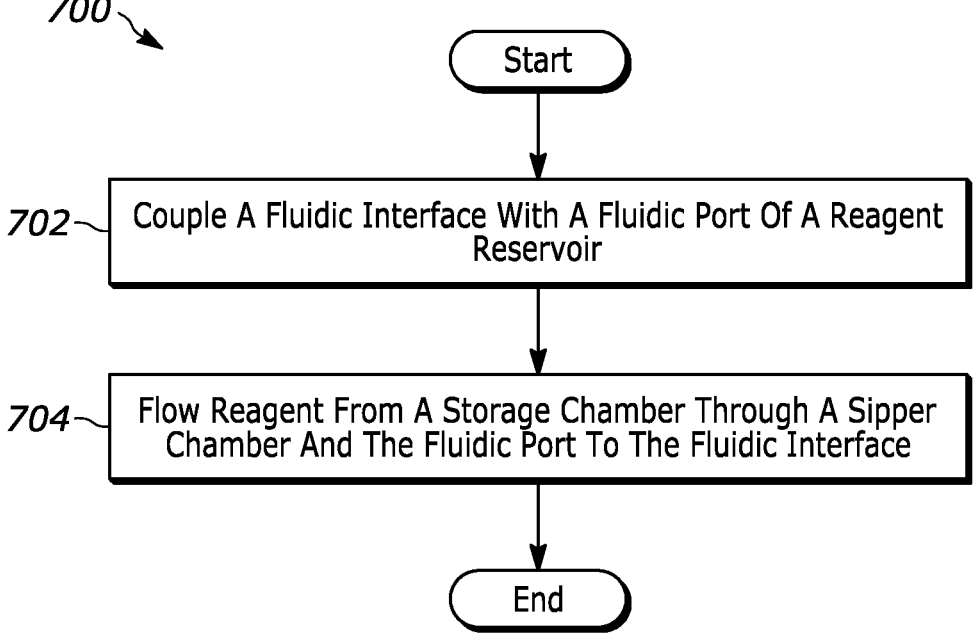
FIG. 10 illustrates a flow chart for a method of using the reagent reservoirs of FIGS. 1-9 with the system of FIG. 1.

FIG. 10 illustrates a flow chart for a method of using the reagent reservoirs 108, 300, 400, 500, 600 of FIGS. 1-9 with the system 100 of FIG. 1. The order of execution of the blocks may be changed, and/or some of the blocks described may be changed, eliminated, combined and/or subdivided into multiple blocks.

The process 700 of FIG. 10 begins the fluidic interface 104 of the system 100 coupling with the fluidic port 132 of the reagent reservoir 108 (Block 702). The reagent reservoir 108 has the body 124 defining the storage chamber 126, the sipper chamber 128, and the fluidic sinus 130 fluidly coupling the storage chamber 126 and the sipper chamber 128. The reagent 133 is flowed from the storage chamber 126 through the sipper chamber 128 and the fluidic port 132 to the fluidic interface 104 (Block 704). The reagent 133 can be flowed from the storage chamber 126 by pressurizing the storage chamber 126 in some implementations. The reagent 133 can be flowed from the storage chamber 126 by the system 100 drawing the reagent 133 from the storage chamber 126 using the pump 170 in some implementations. The reagent 133 can be flowed from the storage chamber 126 by flowing the reagent 133 through the sipper channel 147 defined by the internal surfaces 406 of the body 124 that define the sipper chamber 128 and the stuffer 144 that is received within the sipper chamber 128. The reagent 133 can be flowed from the storage chamber 126 by flowing the reagent 133 through the sipper channel 147 defined by the stuffer 144 received within the sipper chamber 128. Other alternative or additional approaches of flowing the reagent 133 from the storage chamber 126 can prove suitable.

Figure 11:
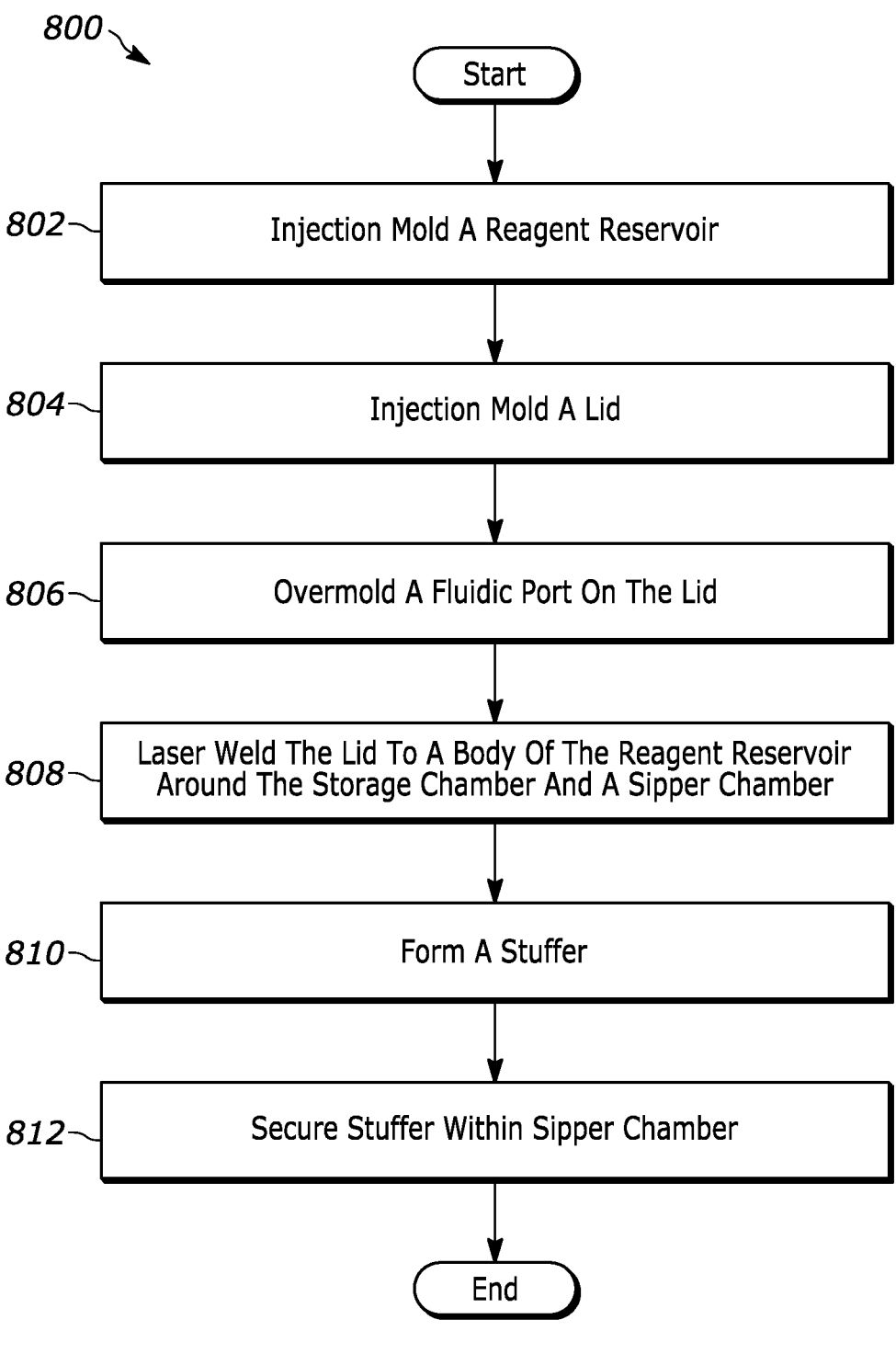
FIG. 11 illustrates a flow chart for a method of manufacturing the reagent reservoirs of FIGS. 1-9 or any of the other implementations disclosed herein.

FIG. 11 illustrates a flow chart for a method of manufacturing the reagent reservoirs 108, 300, 400, 500, 600 of FIGS. 1-9 or any of the other implementations disclosed herein. The order of execution of the blocks may be changed, and/or some of the blocks described may be changed, eliminated, combined and/or subdivided into multiple blocks.

The process 800 of FIG. 11 starts with the reagent reservoir 108, 300, 400, 500, 600 being injected molded 108 (Block 802). The reagent reservoir 108 includes the body 124 defining the storage chamber 126 that is defined in part by the wall 143, the sipper chamber 128 that is defined in part by the wall 143, and the fluidic sinus 130 that is positioned between the storage chamber 126 and the sipper chamber. The lid 137 is injection molded (Block 804). The fluidic port 132 is injection molded on the lid 137 (Block 806). The lid 137 is laser welded to the reagent reservoir 108 around the storage chamber 126 and the sipper chamber 128 (Block 808).

The stuffer 144 is formed 710 (Block 810). The lid 137 can be injection molded and the stuffer 144 can be formed by injection molding the core 402 integral with the lid 137 and overmolding the exterior elastomer 404 over the core 402 to form the stuffer 144. The stuffer 144 can alternatively be formed by injection molding the stuffer 144. The stuffer 144 may not be coupled to the lid 137 in such implementations. The stuffer 144 is secured within the sipper chamber 128.

Figure 12:
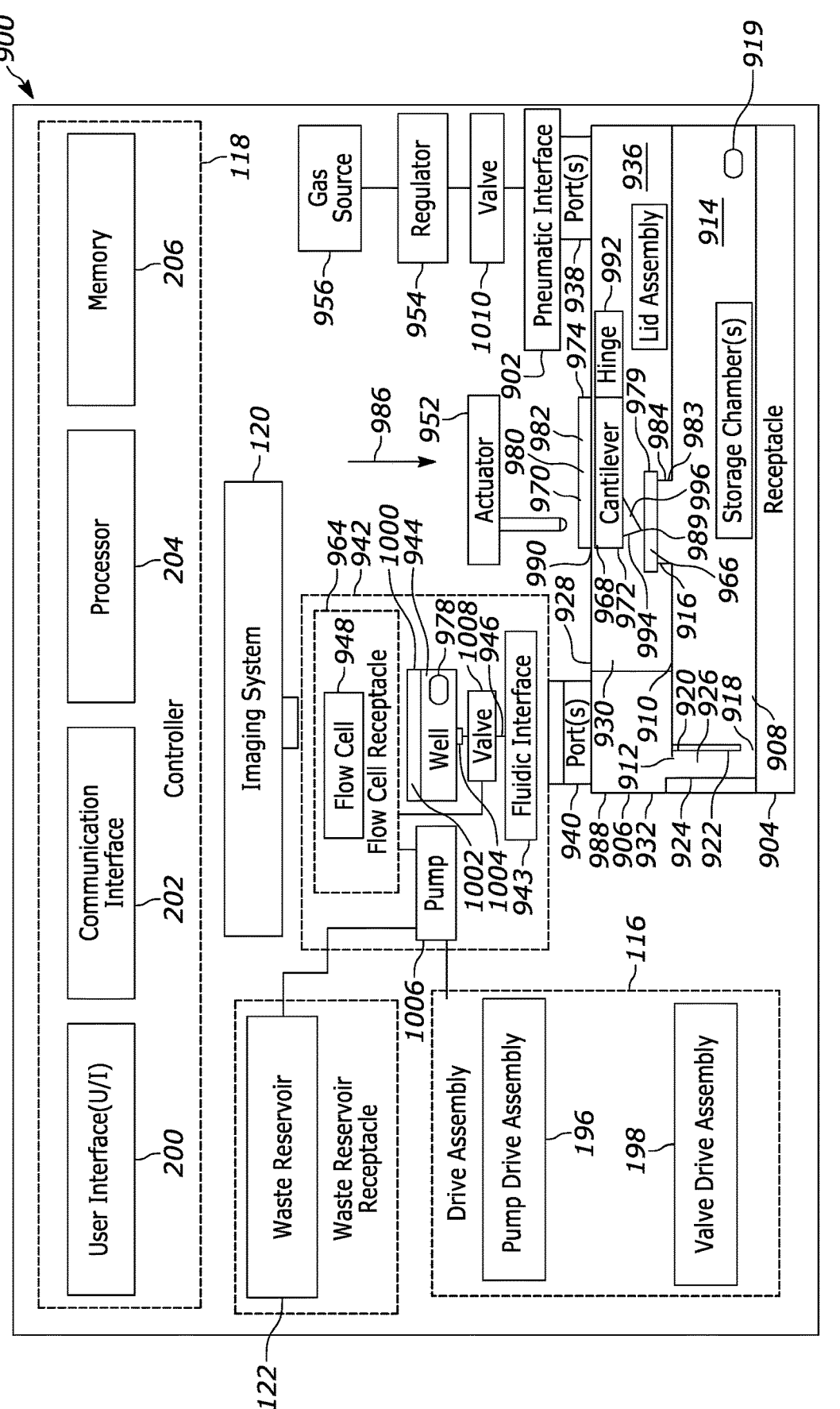
FIG. 12 illustrates a schematic diagram of an implementation of a system in accordance with the teachings of this disclosure.

FIG. 12 illustrates a schematic diagram of an implementation of a system 900 in accordance with the teachings of this disclosure. The system 900 can be used to perform an analysis on one or more samples of interest. The sample may include one or more DNA clusters that are linearized to form a single stranded DNA (sstDNA). In the implementation shown, the system 900 includes a pneumatic interface 902 and a receptacle 904. A liquid reservoir 906 is receivable within the receptacle 904. The liquid reservoir 906 may be referred to as a consumable, a reagent reservoir, or a reagent assembly. The liquid reservoir 906 includes a body 908 having a top surface 910. The top surface 910 has a fluidic opening 912. The body 908 further includes a storage chamber 914 having an opening 916 at the top surface 910 and a fluidic sinus 918. Liquid 919 may be contained within the storage chamber 914. A side 920 of the body 908 defines an outward facing groove 922. The fluidic opening 912 is coupled to the groove 922, and the fluidic sinus 918 fluidly couples the storage chamber 914 and the groove 922. A cover 924 is secured to the side of the body 908. The groove 922 and the cover 924 define a sipper fluidic path 926.

A lid assembly 928 is coupled to the top surface 910. The lid assembly 928 may be laser welded to the top surface 910 of the liquid reservoir 906. The lid assembly 928 may be coupled to the top surface 910 in different ways, however, including adhesive or using another coupling for example. The lid assembly 928 has a first portion 930 covering the opening 916 of the storage chamber 914 and a second portion 932 covering the opening 912 of the sipper fluidic path 926. The top surface 910 of the body 908 and the second portion 932 define a plenum 936. The first portion 930 of the lid assembly 928 has a pneumatic port 938 fluidly coupled to the plenum 936. The second portion 932 includes a fluidic port 940 fluidly coupled to the opening 934 of the sipper fluidic path 926.

A cartridge assembly 942 has a fluidic interface 943 couplable to the fluidic port 940, a well 944, and a channel 946 fluidly coupled between the fluidic interface 943 and the well 944. The fluidic interface 943 is shown coupled to the fluidic port 940 in the implementation shown. Dried reagent 178 may be contained within the well 944.

The cartridge assembly 942 also includes a flow cell 948 in the implementation shown. The cartridge assembly 942 may carry the flow cell 948 such that the flow cell 948 is integrated into the cartridge assembly 942. As used herein, a "flow cell" can include a device having a lid extending over a reaction structure to form a flow channel therebetween that is in communication with a plurality of reaction sites of the reaction structure, and can include a detection device that detects designated reactions that occur at or proximate to the reaction sites. The flow cell 948 may carry the sample of interest. The cartridge assembly 942 may alternatively include a flow cell receptacle 964 that receives the flow cell 948.

Additionally, the system 900 includes, in part, a pneumatic interface 902, an actuator 952, the receptacle 904, a regulator 954, a gas source 956, a drive assembly 116, a controller 118, an imaging system 120, and a waste reservoir 122. The waste reservoir 122 may alternatively be carried by the liquid reservoir 906 as an example. The controller 118 is electrically and/or communicatively coupled to the actuator 952, the regulator 954, the drive assembly 914, and the imaging system 120 and causes the actuator 952, the regulator 954, the drive assembly 914, and/or the imaging system 120 to perform various functions as disclosed herein.

A cover 966 covers the opening 916 of the storage chamber 914 and the lid assembly 928 is coupled to the top surface 910. The cover 966 may be referred to as a storage cover. The cover 966 may be implemented by plastic, foil, rubber, a seal, and/or a plug. The lid assembly 928 may be laser welded to the top surface 910 of the liquid reservoir 906. The lid assembly 928 may be coupled to the top surface 910 in different ways, however, including adhesive or using another coupling for example. The cover 966 may be implemented by plastic, foil, rubber, a seal, and/or a plug.

The first portion 930 of the lid assembly 928 has a cantilever 968, and a compliant barrier 970. The cantilever 968 and the compliant barrier 970 may be formed using a two-shot molding process in some implementations. The compliant barrier 970 may be formed of a thermoplastic elastomer (TPE) as an example. The compliant barrier 970 may have a thickness of about 0.9 millimeters (mm). The compliant barrier 970 may be made of another material and/or have a different thickness, however.

The pneumatic port 938 is fluidly coupled to the plenum 936. The cantilever 968 may be referred to as a piercer. The cantilever 968 has a distal end 972 and the compliant barrier 970 covers the cantilever 968 and defines a portion 974 of the plenum 936.

The actuator 952 is movable to engage the compliant barrier 970 in operation and move the distal end 972 of the cantilever 968 to pierce the storage cover 966 and allow the storage chamber 914 to be fluidly coupled to the plenum 936. The system 900 can thus indirectly actuate the cantilever 968 without the system 900 compromising and/or accessing an interior of the liquid reservoir 906. The engagement between the actuator 952 and the compliant barrier 970 does not vent the plenum 936 to atmosphere as a result.

Liquid 919 is contained within the storage chamber 914 and dried reagent 978 is contained within the well 944. The liquid 919 may be a rehydrating liquid and/or a wash buffer. The liquid 919 may be a different type of liquid, however. The dried reagent 978 may be lyophilized reagent as an example. The liquid reservoir 906 may include any number of storage chambers 914 including one storage chamber as shown and the cartridge assembly 942 may include any number wells 944 including one well as shown. The number of storage chambers 914 that the liquid reservoir 906 has may correspond to the number of wells 944 that the cartridge assembly 942 has in some examples.

The liquid reservoir 906 and/or the cartridge assembly 942 includes a thermoplastic. The liquid reservoir 906 and/or the cartridge assembly 942 may additionally or alternatively include polypropylene and/or cyclic olefin copolymer (COC) with an over molded Santoprene thermoplastic elastomer (TPE) or another thermoplastic elastomer. Other materials may prove suitable for the liquid reservoir 906 and/or the cartridge assembly 942.f The cover 966 that covers the opening 916 may include foil 979 and the compliant barrier 970 may include an elastomer 980 and/or a conformable foil 982. The foil 979 may be a foil with a lacquer backing for bonding to the thermoplastic of the body 908 in some implementations. The lacquer is a coating applied to the cover 966 that promotes the bonding to the body 908 when heat staked, for example. The elastomer 980 may include rubber. The cover 966 and/or the compliant barrier 970 may additionally or alternatively include plastic. The body 908 of the liquid reservoir 906 includes a port 983 having a distal end 984 that defines the opening 916 in the implementation shown. The cover 966 is coupled to the distal end 984 of the port 983. The cover 966 may alternatively be coupled within the port 983 to seal the port 983, for example. The port 983 may alternatively be omitted.

The foil 979 is pierced by the cantilever 968 in operation prior to the storage chamber 914 being pressurized by the gas source 956, for example. The cantilever 968 piercing the cover 966 may allow the pneumatic interface 902 to pressurize the storage chamber 914. The actuator 952 may engage and move the elastomer 980 and/or the conformable foil 982 in a direction generally indicated by arrow 986 and in turn move the distal end 972 of the cantilever 968 in the direction generally indicated by arrow 986 to pierce the foil 979.

The lid assembly 928 in the implementation shown includes a body 988 having the cantilever 968 and the compliant barrier 970 is coupled to the body 988 and covers the cantilever 968. The body 988 has an aperture 990 and the compliant barrier 970 covers the aperture 990. The aperture 990 may alternatively be referred to as an opening or a window. The actuator 952 can move the cantilever 968 by moving the compliant barrier 970 relative to and/or through the aperture 990. The aperture 990 being larger may reduce an amount of force used to actuate the cantilever 968.

The body 988 has a living hinge 992 coupled to the cantilever 968. The living hinge 992 allows the cantilever 968 to move relative to the remainder of the body 988 and for the cantilever 968 to pierce the cover 966. The cantilever 968 may be movably coupled to the body 988 in different ways, however.

The distal end 972 of the cantilever 968 has a protrusion 994 in the implementation shown. The protrusion 994 may be adapted to pierce the cover 966 and allow the cover 966 to be pneumatically coupled to the plenum 936. The protrusion 994 may be shaped to pierce the cover 966 with a lesser amount of force. The protrusion 994 may be an oblique cone 996. The protrusion 994 being an oblique cone 996 may orient a tip 989 of the protrusion 994 to be substantially perpendicular relative to the cover 966 when the protrusion 994 is actuated to pierce the cover 966. The protrusion 994 may pierce the cover 966 with less force being applied as a result. The protrusion 994 may have any other shape and/or the tip 989 may be in any other position, however.

The cartridge assembly 942 includes a cover 1000 shown covering the well 944. The cover 1000 may be referred to as a cartridge cover or a well cover. The cover 1000 may include and/or form a vent 1002 that allows air flow out of the well 944. The vent 1002 is sized to substantially retain the dried reagent 978 within the well 944. The use of the dried reagent 978 in the disclosed implementations may simplify storage requirements, reduce shipping costs, and increase the speed of workflows by, for example, avoiding thaw time before the reagent may be used.

The well 944 includes a port 1004 and the liquid 919 can flow into the well 944 via the port 1004 in practice to rehydrate the dried reagent 978. The vent 1002 may vent gas from the well 944 as the liquid 919 flows into the well 944 and the cover 1000 prevents or inhibits the dried reagent 978 and/or the liquid 919 from escaping from the well 944. Put another way, the vent 1002 retains the dried reagent 978 and/or the liquid 919 within the wells 944 and prevents or inhibits the dried reagent 978 and/or the liquid 919 from migrating out of the wells 944. The vent 1002 and the cover 1000 prevents or inhibits cross-contamination between reagents when the liquid reservoir 906 includes more than one well 944. The liquid 919 and the dried reagent 978 can be flowed into and out of the well 944 to mix the liquid 919 from the liquid reservoir 906 and the dried reagent 978. The system 900 and/or the liquid reservoir 906 may include a mixing chamber that is used to mix the liquid 919 and the dried reagent 978 in some implementations.

The gas source 956 may be used to pressurize the liquid reservoir 906 to flow the liquid 919 into the well 944 and/or a pump 1006 may draw the liquid 919 from the liquid reservoir 906 and flow the liquid 919 into the well 944 to rehydrate the dried reagent 978. The pump 1006 may be used to draw the rehydrated reagent from the well 944 to the flow cell 948 in some implementations. The gas source 956 may be provided by the system 900 and/or the gas source 956 may be carried by the liquid reservoir 906. The gas source 956 may alternatively be omitted.

The cartridge assembly 942 may include the pump 1006 as shown and/or the pump 1006 may be part of the system 900. The pump 1006 may alternatively be omitted. The pump 1006 may be implemented by a syringe pump, a peristaltic pump, a diaphragm pump, etc. While the pump 1006 may be positioned downstream of the flow cell 948 as shown, the pump 1006 may be positioned upstream of the flow cell 948 or omitted entirely.

The cartridge assembly 942 is shown including a valve(s) 1008 that may be actuatable to control the flow of the liquid 919 from the liquid reservoir 906 to the well 944 and/or the flow cell 948. The valve 1008 may be implemented by a three-way valve, a valve manifold, a rotary valve, a selector valve, a pinch valve, a flat valve, a solenoid valve, a check valve, a piezo valve, etc.

The liquid reservoir 906 and/or the system 900 includes a valve 1010 that may be selectively actuatable to control the flow of fluid (gas) to the liquid reservoir 906. The valve 1010 may be implemented by a valve manifold, a rotary valve, a selector valve, a pinch valve, a flat valve, a solenoid valve, a check valve, a piezo valve, etc. The regulator 954 can be positioned between the gas source 956 and the valve 1010 and regulates a pressure of the gas provided to the valve 1010. The regulator 954 may be a valve that controls the flow of the gas from the gas source 956.

The gas source 956 and/or the pump 1006 may flow the liquid 919 to rehydrate dried reagents 978 and to flow one or more liquid reagents (e.g., A, T, G, C nucleotides) through the liquid reservoir 906 that interact with the sample. The gas source 956 may flow the liquid 919 to rehydrate the dry reagents 978 on the cartridge assembly 942 and the pump 1006 on the cartridge assembly 942 may flow the rehydrated reagent (e.g., A, T, G, C nucleotides) to the flow cell 948 that interact with the sample as an example. The reagent with a reversible terminator in an implementation allows a single nucleotide to be incorporated by the sstDNA per cycle. One or more of the nucleotides has a unique fluorescent label in such implementations that emits a color when excited. The color (or absence thereof) is used to detect the corresponding nucleotide. The imaging system 120 excites one or more of the identifiable labels (e.g., a fluorescent label) in the implementation shown and thereafter obtains image data for the identifiable labels. The labels may be excited by incident light and/or a laser and the image data may include one or more colors emitted by the respective labels in response to the excitation. The image data (e.g., detection data) may be analyzed by the system 900. The imaging system 120 may be a fluorescence spectrophotometer including an objective lens and/or a solid-state imaging device. The solid-state imaging device may include a charge coupled device (CCD) and/or a complementary metal oxide semiconusctor (CMOS).

After the image data is obtained, the drive assembly 914 interfaces with the liquid reservoir 906 to flow another reaction component (e.g., a reagent) through the flow cell 948 that is thereafter received by the waste reservoir 122 and/or otherwise exhausted by the cartridge assembly 942. The reaction component performs a flushing operation that chemically cleaves the fluorescent label and the reversible terminator from the sstDNA. The sstDNA is then ready for another cycle.

Referring now to the drive assembly 914, in the implementation shown, the drive assembly 914 includes the pump drive assembly 196 and the valve drive assembly 198. The pump drive assembly 196 interfaces with the pump 1006 to pump fluid through the liquid reservoir 906 and/or the flow cell 948 and the valve drive assembly 198 interfaces with the valves 1008 and/or 1010 to control the position of the valves 1008 and/or 1010.

FIG. 13 illustrates a schematic diagram of an example implementation of a system 1100, a liquid reservoir 906, and a cartridge assembly 942 that can be used to implement the system 900 of FIG. 11. The body 908 includes the storage chamber 914 having the opening 916 at the top surface 910 and the fluidic sinus 918. Liquid 919 may be contained within the storage chamber 914. The side 920 of the body 908 defines the outward facing groove 922. The fluidic opening 912 is coupled to the groove 922, and the fluidic sinus 918 fluidly couples the storage chamber 914 and the groove 922. The cover 924 is secured to the side of the body 908. The groove 922 and the cover 924 define the sipper fluidic path 926.

The system 1100 includes a pneumatic interface 902 and an actuator 952 in the implementation shown having an actuator rod 1222 having a distal end 1224. The pneumatic interface 902 has a bore 1226, a coupling 1228 movably positioned within the bore 1226, and a biasing element 1230. The biasing element 1230 urges the coupling 1228 into sealing engagement with the pneumatic port 938 of the lid assembly 928 in operation. The pneumatic interface 902 can establish a fluidic connection with the liquid reservoir 906 and allow the gas source 956 to pressurize the storage chamber 914 as a result.

The coupling 1228 is shown being cylindrical and having a through hole 1232. The biasing element 1230 is shown as a coil spring 1234. The biasing element 1230 may be differently configured however and may be implemented by a spring, a rubber spring, a Belleville washer as examples.

The fluidic interface 943 of the cartridge assembly 942 has a hollow protrusion 1236 that is positioned within the fluidic port 940 of the lid assembly 928 to fluidly couple the liquid reservoir 906 and the cartridge assembly 942. The hollow protrusion 1236 is conical in the implementation shown to facilitate alignment when coupling the liquid reservoir 906 and the cartridge assembly 942, for example. The cartridge assembly 942 includes a fluidic line 1238 that may be fluidly coupled to the well 944, for example.

Figure 14:
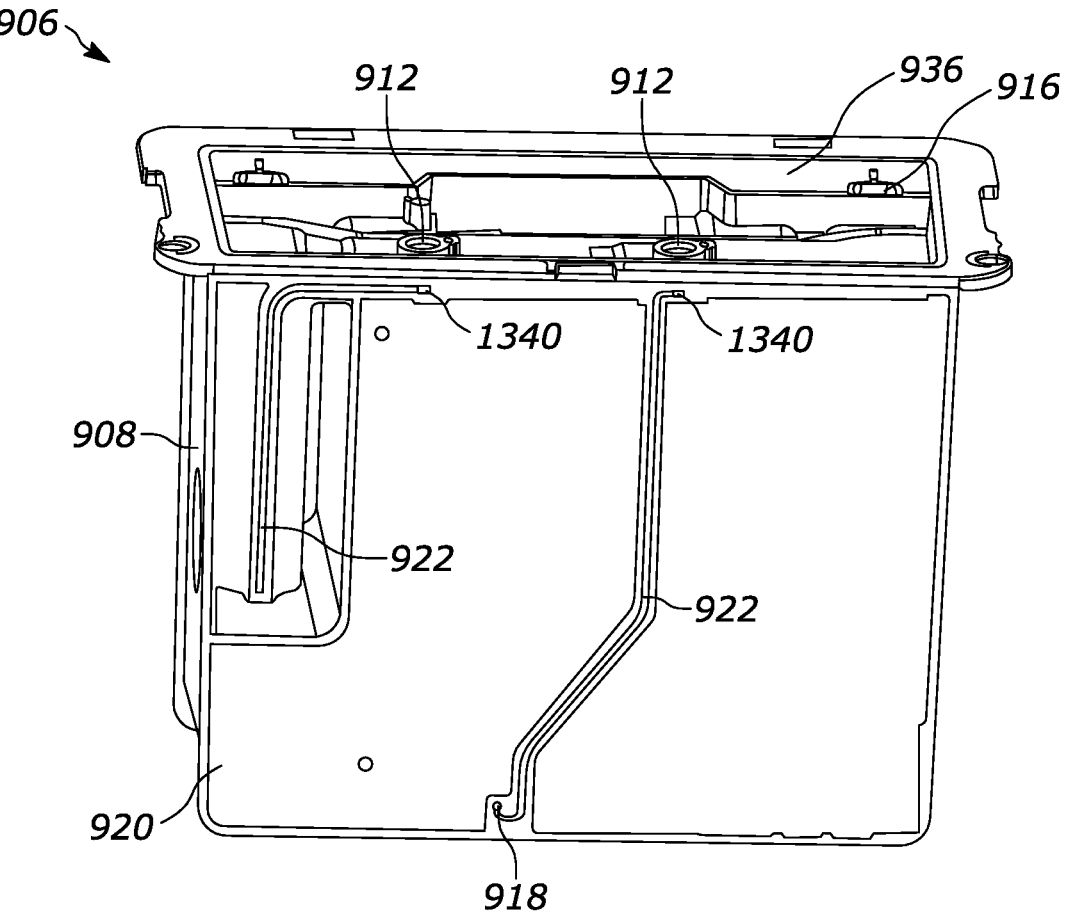
FIG. 14 illustrates a side of a body of the liquid reservoir including an outward-facing groove of FIGS. 12-13.

FIG. 14 illustrates a side 920 of a body 908 of the liquid reservoir 906 including a plurality of outward-facing grooves 922 (as implemented in system 900 in FIG. 12). As shown, a respective fluidic opening 912 is coupled to a respective groove 922. In particular, a horizontal channel 1340 within the body 908 couples the respective fluidic opening 912 to the respective groove 922. In some arrangements, a stuffer 1342 (shown in FIG. 16) may be disposed within the horizontal channel 1340. Fluidic sinuses 918 fluidly couple the storage chamber 914 (shown in FIGS. 12 and 13) to corresponding grooves 922.

Figure 15:
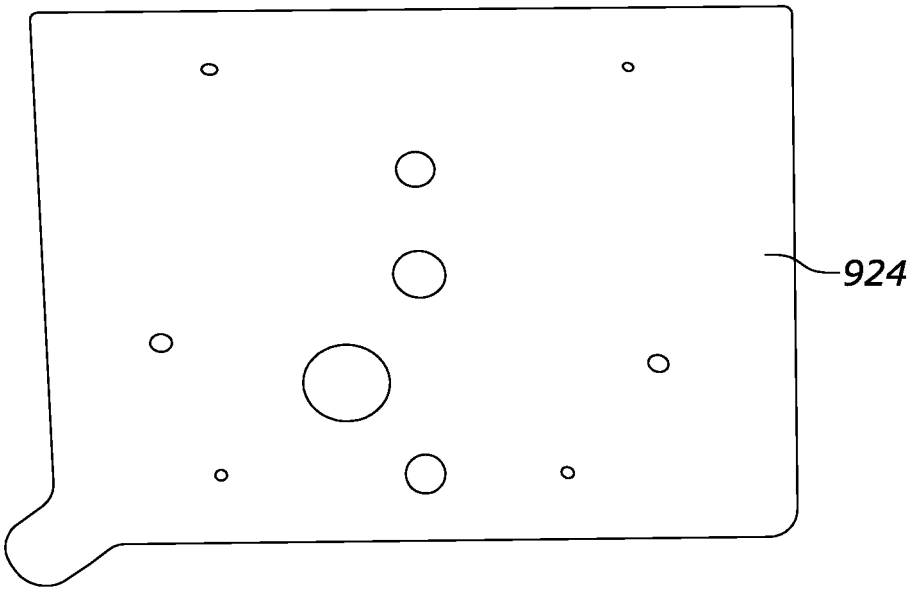
FIG. 15 illustrates a side view of a cover configured to be secured to the side of the body of the liquid reservoir of FIG. 14.

FIG. 15 illustrates a side view of a cover 924 configured to be secured to the side 920 of the body 908 of the liquid reservoir 906 of FIG. 14. The cover 924 may comprise a laminate. When the cover 924 is secured against the side 920 of the body 908, the cover 924 and each groove 922 form a sipper fluidic path 926 (shown in FIGS. 11 and 12).

Figure 16:
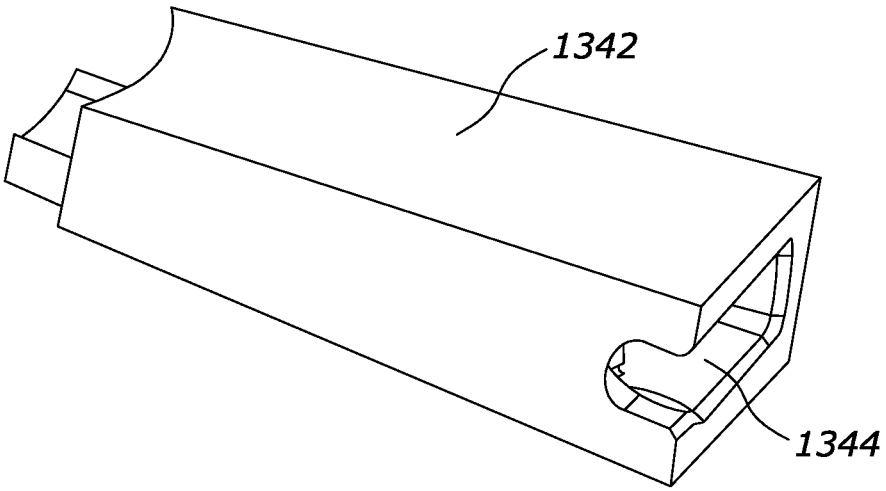
FIG. 16 illustrates a stuffer for securement within a horizontal channel of the body of the liquid reservoir of FIGS. 12-15.

FIG. 16 illustrates a stuffer 1342 configured to be disposed within the horizontal channel 1340 of FIG. 14. The stuffer defines a horizontal channel 1344 fluidly coupling the storage chamber 1314 and a fluidic opening 912.

Figure 17:
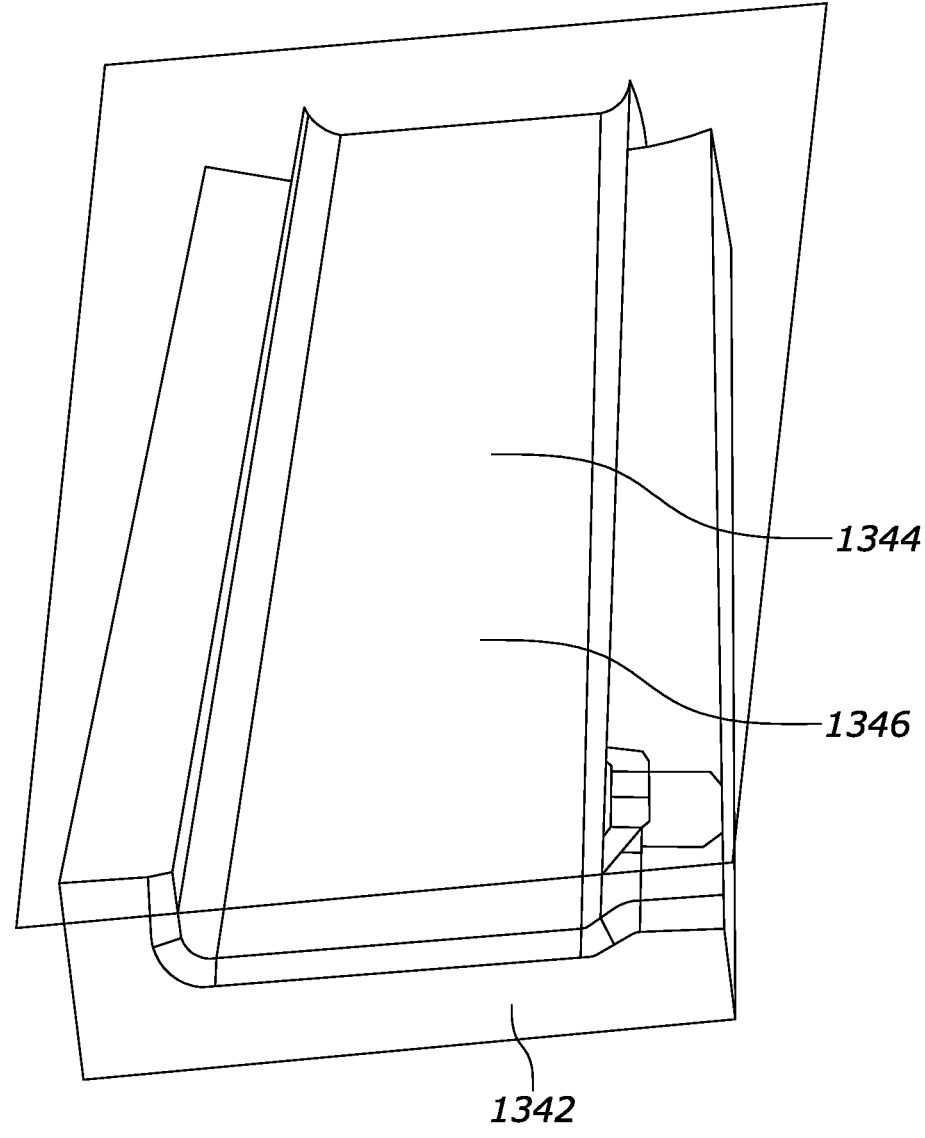
FIG. 17 illustrates a longitudinal cross-sectional view of the stuffer of FIG. 16.

FIG. 17 illustrates a cross-sectional view along a longitudinal axis of the stuffer 1342 to show interior surfaces 1346 of the channel 1344.

Figure 18:
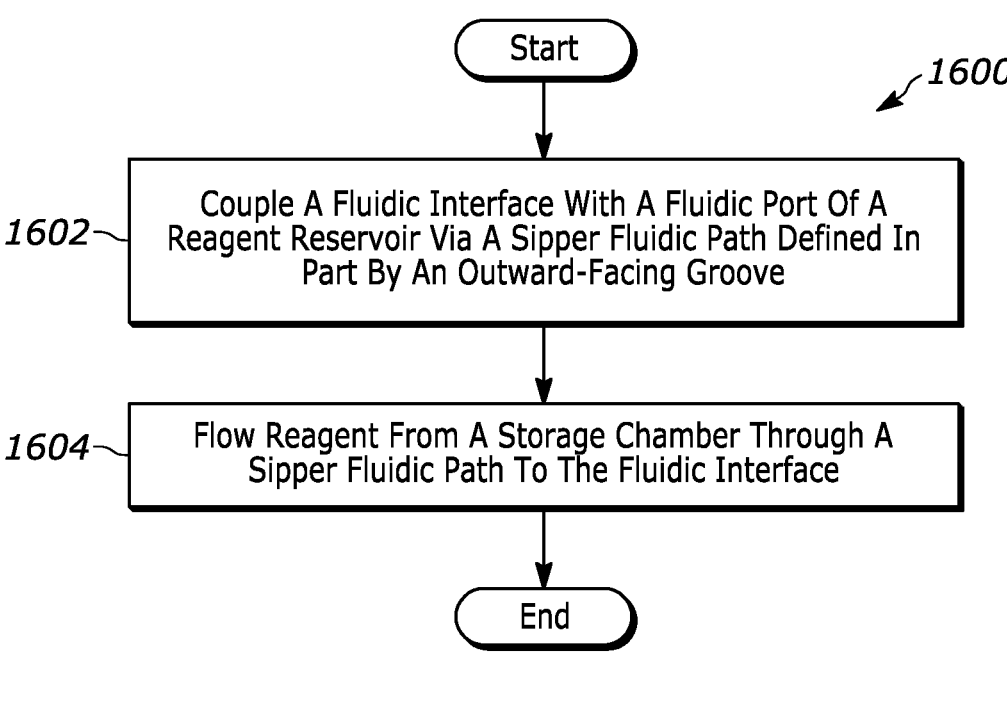
FIG. 18 illustrates a flow chart for a method of using the reagent reservoir of FIG. 14 with the system of FIG. 12.

FIG. 18 illustrates a flow chart for a method of using the reagent reservoir of FIG. 14 with the system of FIG. 12. The order of execution of the blocks may be changed, and/or some of the blocks described may be changed, eliminated, combined and/or subdivided into multiple blocks.

The process 1600 of FIG. 18 begins with coupling the fluidic interface 943 of the cartridge assembly 942 with the fluidic port 940 of the lid assembly 928 by the sipper fluidic path 926 of the liquid reservoir 906 (Block 1602). The liquid reservoir 906 has the body 908 including the top surface 910 that has a fluidic opening 912. The storage chamber 914 has the opening 916 at the top surface 910 and the fluidic sinus 918 and the side 920 of the body 908 define an outward-facing groove 922. The fluidic opening 912 is fluidly coupled to the groove 922, and the fluidic sinus 918 fluidly couples the storage chamber 914 and the groove 922. A cover 924 is secured to the side 920 of the body 908, and the groove 922 and the cover 924 define the sipper fluidic path 926. Reagent is flowed from the storage chamber 914 and through the sipper fluidic path 926 to the fluidic interface 943 (Block 1604). Flowing the reagent from the storage chamber 914 may include the system 900 pressurizing the storage chamber 914. Flowing the reagent to the fluidic interface 943 may include flowing the reagent through a horizontal channel 1340 defined by surfaces of the body 908. Flowing the reagent to the fluidic interface 943 may include flowing the reagent through a horizontal channel 1340 defined by at least one surface of the body 908 and a surface 1344 of a stuffer 1342 received within the horizontal channel 1340 of the body 908.

Figure 19:
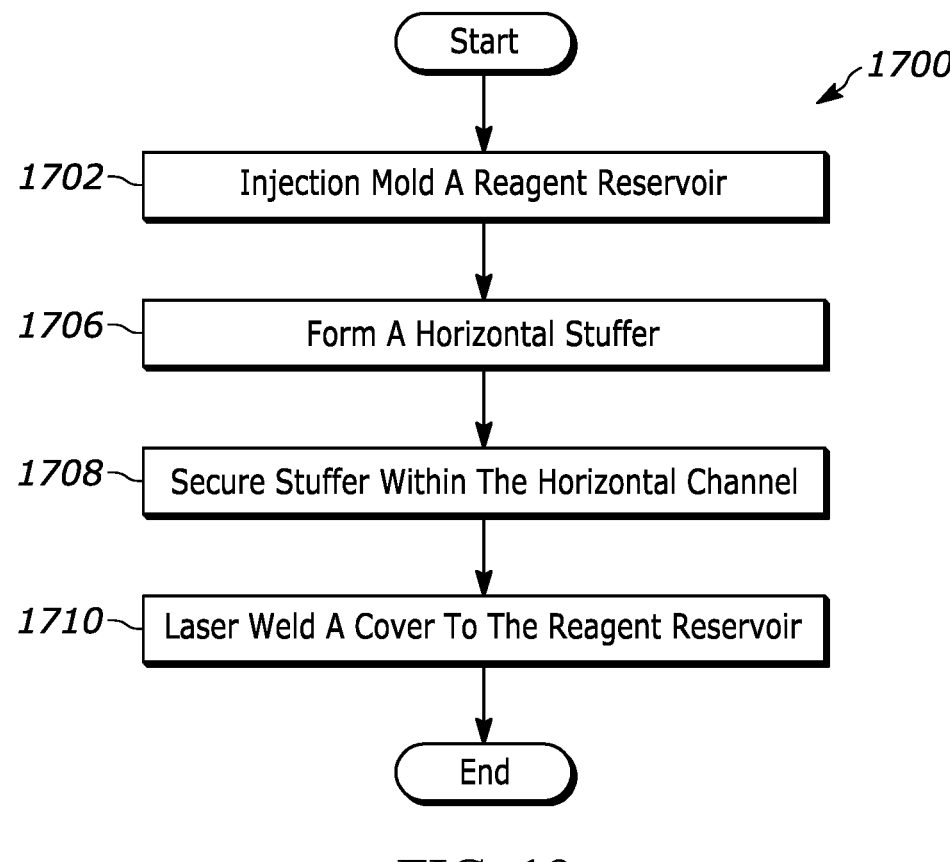
FIG. 19 illustrates a flow chart for a method of manufacturing the reagent reservoir of FIG. 14 and the stuffer of FIG. 16.

FIG. 19 illustrates a flow chart for a method of manufacturing the reagent reservoir 906 of FIG. 12 and the stuffer of FIG. 16 or any of the other implementations disclosed herein. The order of execution of the blocks may be changed, and/or some of the blocks described may be changed, eliminated, combined and/or subdivided into multiple blocks.

The process 1700 of FIG. 19 starts with the reagent reagent reservoir 906 being injection molded (Block 1702). The reagent reservoir includes a body 908 defining a storage chamber 914 and having a side 920 defining an outwardly-facing groove 922. A fluidic sinus 918 fluidly couples the storage chamber 914 and the groove 922. The process 1700 may further include injection molding the horizontal channel 1340 within the body 908 between the groove 922 and the fluidic opening 912 (Block 1706). A stuffer 1342 may then be secured within the horizontal channel 1340 (Block 1708). A cover 924 is laser welded to the reagent reservoir 906 to form the sipper fluidic path 926 between the groove 922 and the cover 924 (Block 1710).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

While cartridges and reservoirs are described herein with regard to reagent cartridges and reagent reservoirs, these cartridges or reservoirs may also be used to house other liquids, including without limitation buffers, samples, and washes, either separate from or in combination with reagents or other liquids. For example, a cartridge may have a first chamber housing a reagent, a second chamber housing a buffer, and a third chamber housing a wash. Furthermore, the cartridges and reservoirs described herein may include one or more additional chambers that may be used, for example, as waste chambers on the cartridge that may or may not include corresponding sipper chambers.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including, "having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The terms "connect," "connected," "contact," "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus comprising:
a system, comprising:
    a pneumatic interface; and
    a receptacle;
a liquid reservoir receivable within the receptacle and having:
    a body comprising a top surface comprising a fluidic opening, a storage chamber having an opening at the top surface, a fluidic sinus, and a side of the body defining an outward-facing groove, the fluidic opening fluidly coupled to the groove, and the fluidic sinus fluidly coupling the storage chamber and the groove,
    a cover secured to the side of the body, the groove and the cover defining a sipper fluidic path, the fluidic sinus is positioned adjacent a bottom surface of the storage chamber, the fluidic sinus fluidly couples the storage chamber and the sipper fluidic path;
    a lid assembly coupled to the top surface and having a first portion covering the opening of the storage chamber and a second portion covering the fluidic opening, the top surface and the first portion defining a plenum,
the first portion comprising a pneumatic port fluidly coupled to the plenum; and
the second portion comprising a fluidic port fluidly coupled to the fluidic opening, the sipper fluidic path extending from the fluidic sinus, along the side, and toward the fluidic opening; and
a cartridge assembly, comprising:
    a fluidic interface removably couplable to the fluidic port;
    a well; and
    a channel fluidly coupled between the fluidic interface and the well.

2. The apparatus of claim 1, further comprising liquid contained within the storage chamber.

3. The apparatus of claim 1, further comprising dried reagent contained within the well.

4. The apparatus of claim 1, wherein the cartridge assembly comprises a flow cell.

5. The apparatus of claim 1, wherein the cover comprises a laminate.

6. The apparatus of claim 1, further comprising a horizontal channel within the body between the groove and the fluidic opening.

7. The apparatus of claim 6, further comprising a stuffer disposed within the horizontal channel.

8. The apparatus of claim 7, wherein the stuffer defines a horizontal channel fluidly coupling the storage chamber and the fluidic port.

* * * * *